US012707420B2

(12) United States Patent
Chiarello et al.

(10) Patent No.: US 12,707,420 B2
(45) Date of Patent: Aug. 11, 2026

(54) PROCEDURES AND SIGNALLING TO ENHANCE POSITIONING INTEGRITY USING PRU MEASUREMENTS

(71) Applicant: Nokia Technologies Oy, Espoo (FI)

(72) Inventors: Leonardo Chiarello, Munich (DE); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 18/374,399

(22) Filed: Sep. 28, 2023

(65) Prior Publication Data

US 2025/0113324 A1 Apr. 3, 2025

(51) Int. Cl.
*G01S 5/02* (2010.01)
*H04W 64/00* (2009.01)

(52) U.S. Cl.
CPC .......... *H04W 64/00* (2013.01); *G01S 5/0244* (2020.05)

(58) Field of Classification Search
None
See application file for complete search history.

(56) References Cited

U.S. PATENT DOCUMENTS

2024/0159855 A1* 5/2024 Saini .................. H04W 64/003
2024/0389063 A1* 11/2024 Chen .................... H04W 64/00
2025/0203572 A1* 6/2025 Thomas ................ H04W 76/14

OTHER PUBLICATIONS

Intel Corporation, CATT, Ericsson "Revised SID on Study on Expanded and Improved NR Positioning" 3GPP TSG RAN Meeting #97-e RP-222616. Electronic Meeting, Sep. 12-16, 2022.
3rd Generation Partnership Project; Technical Specification Group Radio Access Network; Study on NR Positioning Enhancements; (Release 17) 3GPP TR 38.857 V17.0.0 (Mar. 2021).
3rd Generation Partnership Project; Technical Specification Group Radio Access Network; Study on Expanded and Improved NR Positioning; (Release 18) 3GPP TR 38.859 V18.0.0 (Dec. 2022).
3rd Generation Partnership Project; Technical Specification Group Radio Access Network; LTE Positioning Protocol (LPP) (Release 17) 3GPP TS 37.355 V17.5.0 (Jun. 2023).

* cited by examiner

*Primary Examiner* — Idowu O Osifade
(74) *Attorney, Agent, or Firm* — Barta Jones, PLLC

(57) ABSTRACT

An apparatus comprising: at least one processor; at least one non-transitory memory storing instructions that, when executed by the at least one processor, cause the apparatus at least to: receive, from a measuring device or a location management function, measuring device positioning information; perform at least one positioning integrity check, based on the measuring device positioning information; determine at least one positioning integrity result based on the at least one positioning integrity check; wherein the at least one positioning integrity result comprises at least one measuring device positioning integrity result and at least one transmission reception point positioning integrity result; transmit, to the measuring device, the at least one measuring device positioning integrity result and the at least one transmission reception point positioning integrity result; determine measuring device correction information, based on the at least one positioning integrity check; and transmit, to the measuring device, the measuring device correction information.

10 Claims, 12 Drawing Sheets

PROCEDURES AND SIGNALLING TO ENHANCE POSITIONING INTEGRITY USING PRU MEASUREMENTS

TECHNICAL FIELD

The examples and non-limiting example embodiments relate generally to communications and, more particularly, to procedures and signaling to enhance positioning integrity using PRU measurements.

BACKGROUND

It is known to estimate a position of a terminal device in a communication network using reference signals.

SUMMARY

In accordance with an aspect, an apparatus includes at least one processor; and at least one non-transitory memory storing instructions that, when executed by the at least one processor, cause the apparatus at least to: receive, from a measuring device or a location management function, measuring device positioning information; perform at least one positioning integrity check, based on the measuring device positioning information; determine at least one positioning integrity result based on the at least one positioning integrity check; wherein the at least one positioning integrity result comprises at least one measuring device positioning integrity result and at least one transmission reception point positioning integrity result; transmit, to the measuring device, the at least one measuring device positioning integrity result and the at least one transmission reception point positioning integrity result; determine measuring device correction information, based on the at least one positioning integrity check; and transmit, to the measuring device, the measuring device correction information.

In accordance with an aspect, an apparatus includes at least one processor; and at least one non-transitory memory storing instructions that, when executed by the at least one processor, cause the apparatus at least to: receive, from a location management function or a user equipment, a request for transmission reception point positioning information; transmit, to the location management function or to the user equipment, the transmission reception point positioning information; and receive, from an integrity management function implemented by the location management function or the user equipment, transmission reception point correction information.

In accordance with an aspect, an apparatus includes at least one processor; and at least one non-transitory memory storing instructions that, when executed by the at least one processor, cause the apparatus at least to: receive, from a location management function or a user equipment, a request for measuring device positioning information; transmit, to the location management function or the user equipment, the measuring device positioning information; receive, from an integrity management function implemented by the location management function or the user equipment, measuring device correction information; and receive, from the integrity management function, at least one measuring device positioning integrity result and at and at least one transmission reception point positioning integrity result.

In accordance with an aspect, an apparatus includes at least one processor; and at least one non-transitory memory storing instructions that, when executed by the at least one processor, cause the apparatus at least to: receive, from a location services client, a request for at least one positioning integrity result based on at least one measurement of a measuring device; transmit, to an integrity management function, the request for the at least one positioning integrity result based on the at least one measurement of the measuring device; receive, from the integrity management function, at least one positioning integrity result based on the at least one measurement of the measuring device; wherein the at least one positioning integrity result comprises at least one measuring device positioning integrity result or at least one transmission reception point positioning integrity result; and forward, to the location services client, the at least one positioning integrity result; wherein the apparatus comprises a location management function.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
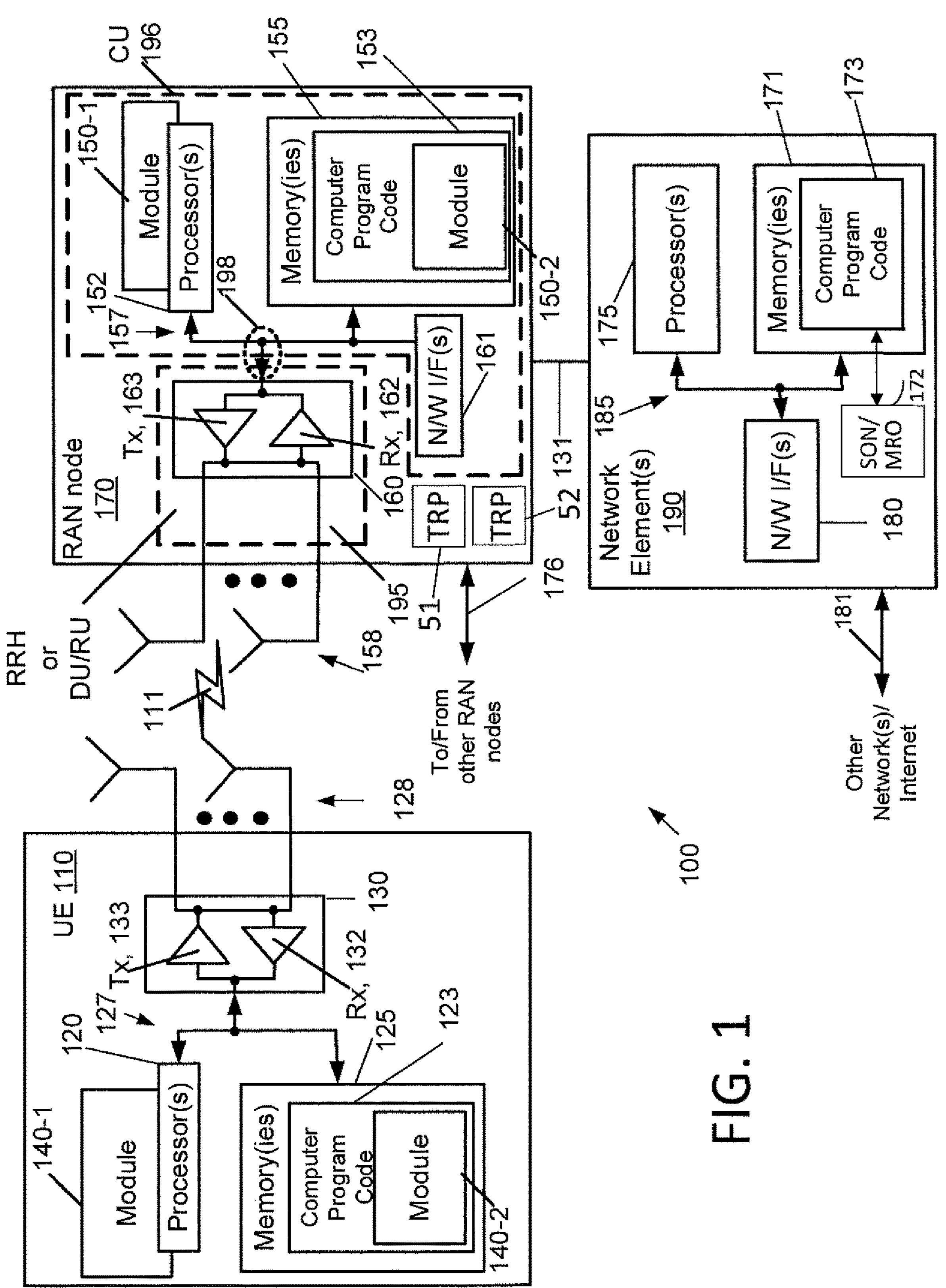
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-cNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor (s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises TRP 51 and TRP 52, in addition to the TRP represented by transceiver 160. Similar to transceiver 160, TRP 51 and TRP 52 may each include a transmitter and a receiver. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other LAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

NG-RAN UE Positioning Architecture

Figure 2:
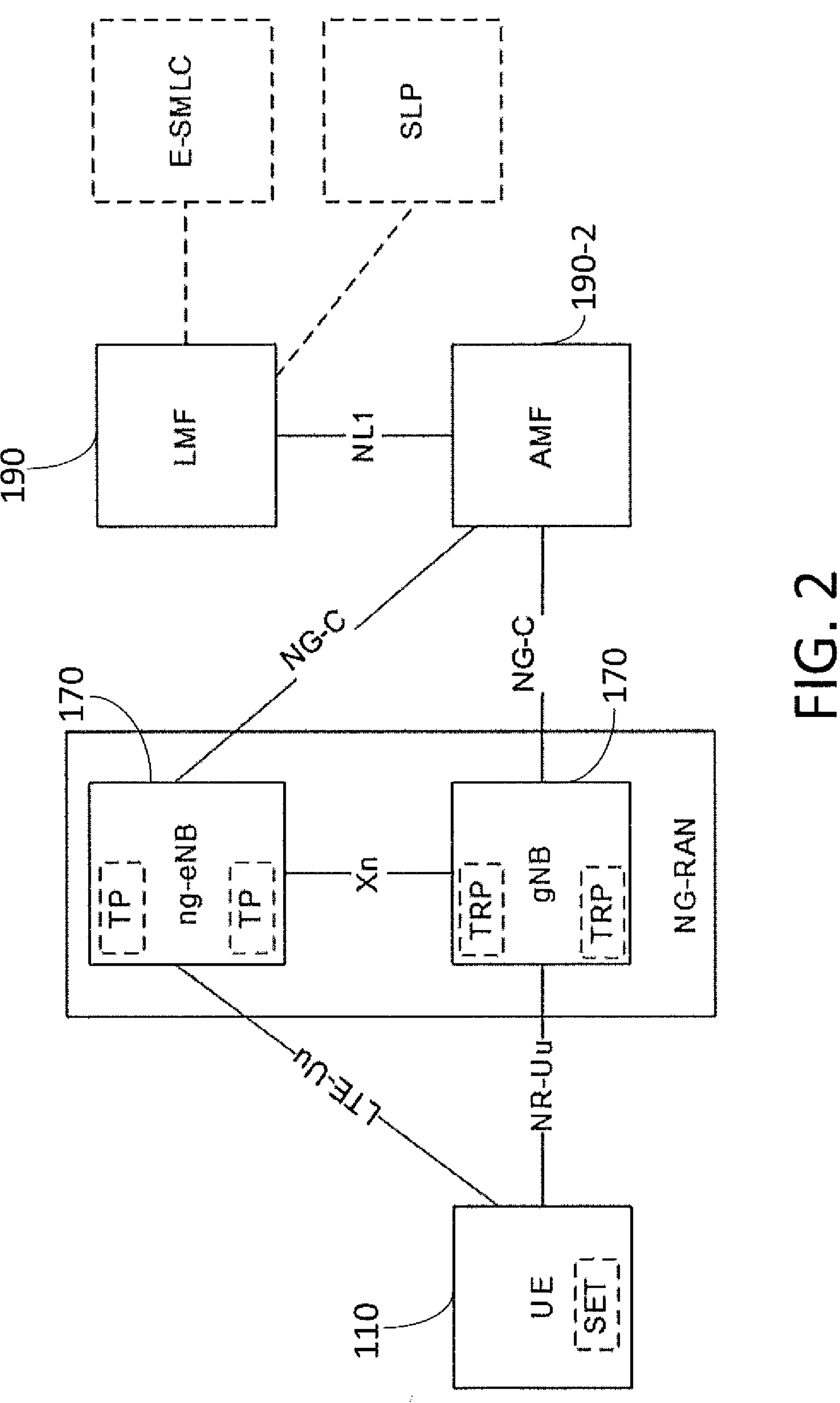
FIG. 2 shows a UE positioning overall architecture applicable to NG-RAN.

FIG. 2 shows the UE positioning overall architecture applicable to NG-RAN (from TS 38.305). To support positioning of a target User Equipment (UE) 110 and delivery of location assistance data to a UE 110 with Next Generation Radio Access Network (NG-RAN) access in 5G System (5GS), location related functions are distributed as shown in the architecture in FIG. 2. In particular, the main elements involved are the location management function (LMF) 190, the access and mobility management function (AMF) 190-2, the gNB 170 and ng-eNB 170, the UE 110, and the positioning reference unit (PRU).

Location Management Function (LMF) 190: it manages the support of different location services for target UEs, including positioning of UEs and delivery of assistance data to UEs; for positioning of a target UE, the IMF decides on the position methods to be used. The LMF then invokes these positioning methods in the UE, serving Next Generation NodeB (gNB) and/or serving Next Generation e-NodeB (ng-eNB). The positioning methods may yield a location estimate for UE-based position methods and/or positioning measurements for UE-assisted and network-based position methods. The LMF may combine all the received results and determine a single location estimate for the target UE (hybrid positioning).

Access and Mobility Management Function (AMF) 190-2: it receives all connection and session related information from the UE and it is responsible for handling connection and mobility management tasks; all the location service requests are forwarded to an LMF.

gNB and ng-eNB (170): they are network elements of NG-RAN that may provide/receive measurement information for/from a target UE and communicate this information to an LMF. For such transmission/reception of information they include one or more Transmission/Reception Points (TRPs).

UE 110: it may make measurements of downlink signals from NG-RAN and other sources such as Evolved UMTS Terrestrial Radio Access Network (E-UTRAN), different Global Navigation Satellite Systems (GNSSs) and Terrestrial Beacon Systems (TBSs), Wireless Local-Area Network (WLAN) access points, Bluetooth beacons, UE barometric pressure and motion sensors, measurements to be made may be determined by the chosen positioning method.

Positioning Reference Unit (PRU) 110: it could be considered as a UE at a known location and it can perform positioning measurements and report these measurements to a location server. Because the PRU location is known, the PRU location therefore can be used as a ground truth location. In addition, the PRU can transmit Sounding Reference Signal (SRS) to enable TRPs to measure and report UL positioning measurements from PRU at a known location. The PRU measurements can be compared by a location server with the measurements expected at the known PRU location to determine correction terms for other nearby target devices. The Downlink (DL) and/or Uplink (UL) location measurements for other target devices can then be corrected based on the previously determined correction terms.

UE Positioning Operations

Figure 3:
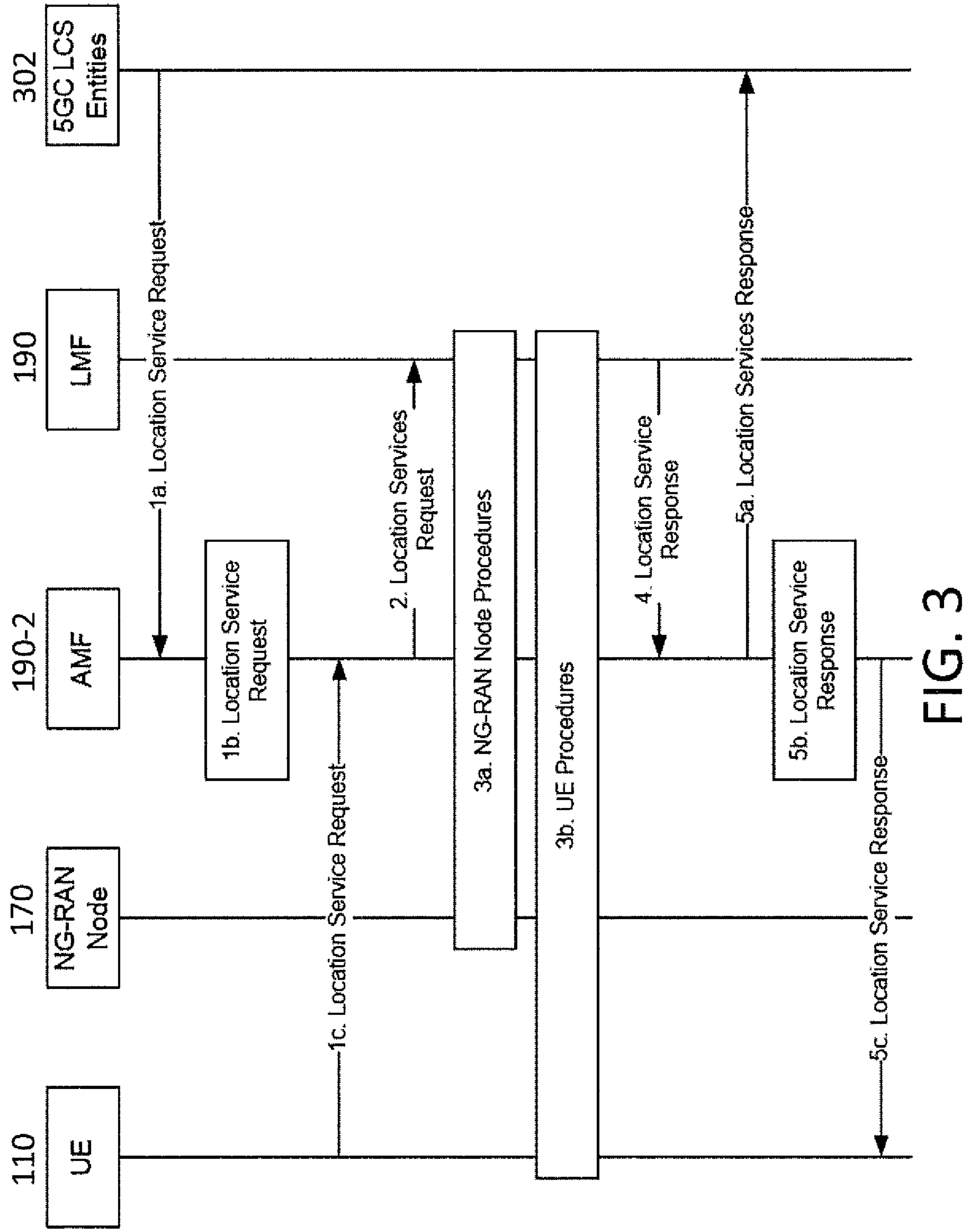
FIG. 3 shows location service support by an NG-RAN.

The overall sequence of events applicable to the UE 110, NG-RAN 170 and LMF 190 for any location service is shown in FIG. 3 (the AMF 190-2 and 5GC LCS entities 302 are also includes in the messaging exchange):

1a. Either: some entity in the 5GC (e.g. Gateway Mobile Location Centre [GMLC]) requests some location service (e.g. positioning) for a target UE to the serving AMF.

1b. Or: the serving AMF for a target UE determines the need for some location service (e.g. to locate the UE for an emergency call).

1c. Or: the UE requests some location service (e.g. positioning or delivery of assistance data) to the serving AMF at the NAS level.

2. The AMF transfers the location service request to an LMF.

3a. The LMF instigates location procedures with the serving and possibly neighboring ng-eNB or gNB in the NG-RAN—e.g. to obtain positioning measurements or assistance data.

3b. In addition to step 3a or instead of step 3a, the LMF instigates location procedures with the UE—e.g. to obtain a location estimate or positioning measurements or to transfer location assistance data to the UE.

4. The LMF provides a location service response to the AMF and includes any needed results—e.g. success or failure indication and, if requested and obtained, a location estimate for the UE.

5a. If step 1a was performed, the AMF returns a location service response to the 5GC entity in step 1a and includes any needed results—e.g. a location estimate for the UE.

5b. If step 1b occurred, the AMF uses the location service response received in step 4 to assist the service that triggered this in step 1b (e.g. may provide a location estimate associated with an emergency call to a GMLC).

5c. If step 1c was performed, the AMF returns a location service response to the UE and includes any needed results—e.g. a location estimate for the UE.

Location procedures applicable to NG-RAN occur in steps 3a and 3b. Steps 3a and 3b can involve the use of different position methods to obtain location related measurements for a target UE and from these compute a location estimate and possibly additional information like velocity.

Accordingly, FIG. 2 shows location Service Support by the NG-RAN (from TS 38.305).

Positioning Integrity

The ability to navigate safely means users must trust their estimated position with a high degree of confidence. Positioning integrity is a measure of the trust in the accuracy of the position-related data provided by the positioning system and the ability to provide timely and valid warnings to the Location Service (LCS) client when the positioning system does not fulfil the condition for intended operation.

The following KPIs for positioning integrity are defined (1-5):

1. Target Integrity Risk (TIR): The probability that the positioning error exceeds the Alert Limit (AL) without warning the user within the required Time-to-Alert (TTA).
2. AL: The maximum allowable positioning error such that the positioning system is available for the intended application. If the positioning error is beyond the AL, the positioning system should be declared unavailable for the intended application to prevent loss of positioning integrity.
3. TTA: The maximum allowable elapsed time from when the positioning error exceeds the AL until the function providing positioning integrity annunciates a corresponding alert.
4. Protection Level (PL): A statistical upper-bound of the Positioning Error (PE) that ensures that, the probability per unit of time of the true error being greater than the AL and the PL being less than or equal to the AL, for longer than the TTA, is less than the required TIR, i.e., the PL satisfies the following inequality:

$$\text{Prob per unit of time}[((PE > AL)\ \&\ (PL <= AL)) \text{ for longer than } TTA] < \text{required } TIR \quad \text{(Equation 1)}$$

In other words, the PL is used to indicate the positioning system availability, as when the PL is greater than the AL, the system is considered unavailable.

5. Integrity Availability: The integrity availability is the percentage of time that the PL is below the required AL.

The TIR is a design constraint for a positioning system and represents the probability that a positioning error exceeds the AL, but the positioning system fails to alert the user within the required period of time (i.e., TTA). In practice, the TIR is very small. For example, <10-7/hr TIR translates to one failure permitted every 10 million hours (equivalent to 1142 years approximately).

Positioning integrity system failures are known as Integrity Events and integrity events occur when the positioning system outputs Hazardous Misleading Information (HMI). HMI occurs when, the positioning being declared available, the actual positioning error exceeds the AL without annunciating an alert within the required TTA. Misleading Information (MI) occurs when, the positioning system being declared available, the actual positioning error exceeds the PL. Typically, positioning systems are designed to tolerate some level of MI, provided the system can continue to operate safely within the AL. To properly monitor for integrity in the positioning system, both the fault and fault-free conditions which potentially lead to MI or HMI need to be characterized for the network and the UE.

Figure 4:
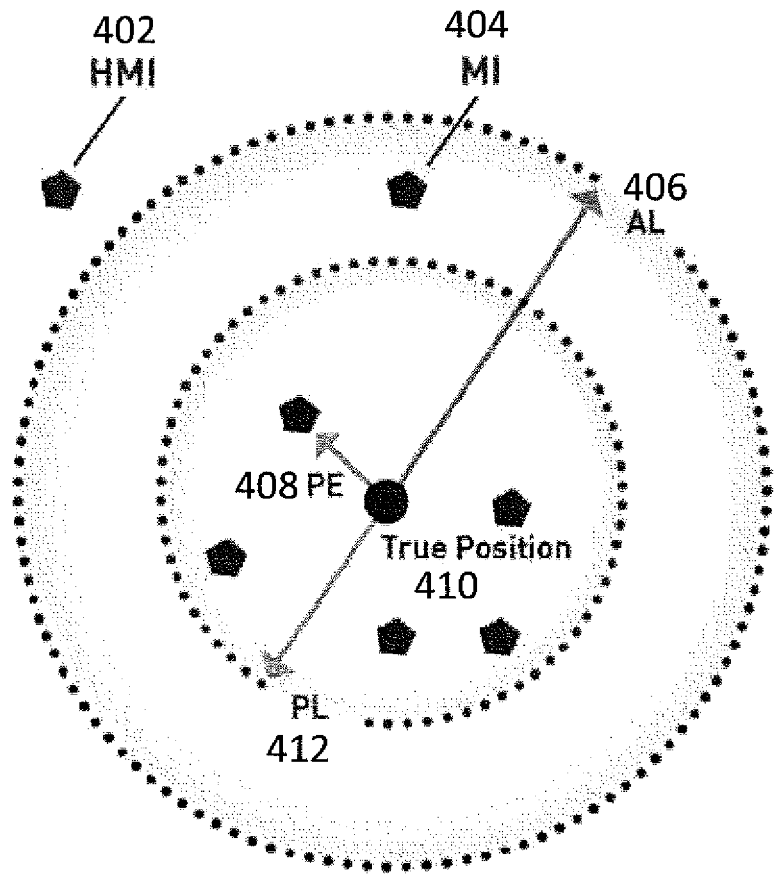
FIG. 4 shows the relationship between PE, PL, AL, MI, and HMI.

FIG. 4 illustrates the concept of MI 404 and HMI 402 with respect to the Key Performance Indicators (KPIs), PL 412 and PE 408. In particular, FIG. 4 shows the relationship between PE 408, PL 412, AL 406, MI 404, HMI 402, and the true position 410 (from TR 38.857).

Within the study item "Study on Expanded and Improved NR Positioning" (RP-222616), the main objective of the study on solutions for integrity for RAT-dependent positioning techniques was the identification of error sources for RAT-dependent positioning techniques.

UE-based/assisted DL positioning methods, UL and DL&UL positioning methods were considered in the study. Table 1 presents the identified error sources for LMF-based and UE-based positioning integrity modes for different positioning methods.

Error: Error is the difference between the true value of a parameter (e.g. Antenna Reference Point (ARP) location, Round Trip Delay (RTD), etc.), and its value as provided in the corresponding assistance data.

Bound: Integrity Bounds provide the statistical distribution of the errors.

TTA: The maximum allowable elapsed time from when the Error exceeds the Bound until a DNU flag must be issued.

DNU: The DNU flag(s) corresponding to a particular error as per Table 1. Where multiple DNU flags are specified, the DNU condition in Equation 2 is present when any of the flags are true (logical OR of the flags).

Residual Risk: The residual risk is the component of the integrity risk provided in the assistance data. This may correspond to the fault case risk, but the implementation is permitted to allocate this component in any way that satisfies Equation 2.

The Residual Risk is the Probability of Onset which is defined per unit of time and represents the probability that the feared event begins. Hach Residual Risk is accompanied by a Mean Duration which represents the expected mean duration of the corresponding feared event and is used to convert the Probability of Onset to a probability that the feared event is present at any given time

TABLE 1

Error sources for LMF-based and UE-based positioning integrity modes (from TR 38.859).

| Positioning Integrity Mode | DL-TDoA | UL-TDoA | Multi-cell Round Trip Time (Multi-RTT) | UL-AoA | DL-AoD |
|---|---|---|---|---|---|
| LMF-based (as defined in Table 9.4.1.1.1 in TR 38.857) | Reference Signal Time Difference (RSTD) measurement<br>TRP location<br>Inter-TRP synchronization | Relative Time of Arrival (RTOA) measurement<br>TRP location<br>Inter-TRP synchronization | UE Rx-Tx time difference measurement<br>gNB Rx-Tx time difference measurement<br>TRP location | Angle of arrival measurement<br>TRP location<br>ARP location | TRP location<br>DL-PRS Reference Signal Received Path Power (RSRPP) of the first path or Reference Signal Received Power (RSRP)<br>TRP location |
| UE-based (as defined in Table 9.4.1.1.1 in TR 38.857) | TRP location<br>Inter-TRP synchronization | | | | |

For UE-based positioning integrity mode, whether boresight direction of DL-Positioning Reference Signal (PRS) (NR-DL-PRS-BeamInfo in TS 37.355) and/or beam information (NR-TRP-BeamAntennaInfo in TS 37.355) of DL-PRS can be error sources were considered to be further studied during normative work.

For integrity operation, the network ensures that:

$$P(\text{Error} > \text{Bound for longer than } TTA \mid \text{NOT } DNU) <= \text{Residual Risk} + IRallocation \quad \text{(Equation 2)}$$

for all values of IRallocation in the range irMinimum<=IRallocation<=irMaximum for all the errors in Table 1, which have corresponding integrity assistance data available and where the corresponding Do Not Use (DNU) flag(s) are set to false.

The following are defined as used in the probability formulation given as Equation 2:

irMinimum, irMaximum: Minimum and maximum allowable values of/Rallocation that may be chosen by the client. Provided as service parameters from the Network according to Integrity Service Parameters.

The integrity risk probability is decomposed into a constant Residual Risk component provided in the assistance data as well as a variable IRallocation component. IRallocation may be chosen freely by the client based on the desired Bound, therefore, the network should ensure that Equation 2 holds for all possible choices of IRallocation. The Residual Risk and IRallocation components may be mapped to fault and fault-free cases respectively, but the implementation is free to choose any other decomposition of the integrity risk probability into these two components.

Equation 2 holds for all assistance data that has been provided that is still within its validity period. If this condition cannot be met then the corresponding DNU flag must be set.

Equation 2 holds at any epochs for which Assistance Data is provided. Providing Assistance Data without the Integrity Alerts is interpreted as a DNU=FALSE condition. For any bound that is still valid (within its validity time), the network ensures that the Integrity Alert IEs are also included in the provided Assistance Data if needed to satisfy the condition in Equation 2. It is up to the implementation how to handle epochs for which integrity results are desired but there are no DNU flag(s) available, e.g. the TTA may be set such that there is a "grace period" to receive the next set of DNU flags.

Only those TRPs for which the integrity assistance data are provided are monitored by the network and can be used for integrity related applications.

In the RAN2 #123 3GPP meeting the following was agreed:

Agreements:
The DNU flags are provided per TRP and per error contribution (e.g., TRP location, RTD, beam information, etc.) in a new IE NR-Integrity-ServiceAlert.
DNU flags for TRP/UE positioning measurements are not needed.
The 'Integrity Correlation Times', defining the minimum time interval beyond which two sets of assistance data parameters for a given error can be considered to be independent from one another, can optionally be provided for the integrity assistance data.
It is left to LMF implementation to decide the measurement error source bound distribution based on the measurement results provided to the LMF from UE and/or NG-RAN.
The beam related information (Beam Bore-Sight Direction/Beam Antenna Information) are error sources for DL-AoD positioning. FFS if RAN2 support signalling this information.

Starting with the agreement related to beam related information being error sources, RAN2 has recognized the beam related information as error sources for DL-AoD positioning. However, there is an FFS for the normative work on the integrity error sources to further study whether the boresight direction and/or beam information of DL-PRS is to be included in the LTE Positioning Protocol (LPP) Information Elements (IEs) NR-DL-PRS-BeamInfo and NR-TRP-BeamAntennaInfo, respectively, specified in TS 37.355.

Moreover, there is currently no consideration in the integrity specification regarding identifying the network entity causing the positioning integrity notification. For example, a positioning integrity notification may be caused by a misalignment between the information provided to the UE for AoD UE-based positioning and the actual direction that the respective beam is pointing. Or in another practical scenario, the error message may originate at the UE or even more specifically at the PRU side, caused by either a measurement error at the UE/PRU or a misalignment between the PRU's reported ground truth information and actual ground truth information. The "positioning integrity notification" is herein defined as a warning to the Location Service (LCS) client when the positioning system does not fulfil the condition for intended operation.

In other words, there is a gap in the standards and known prior art with regards to identifying the origin of a positioning integrity notification. Knowing the origin and/or cause of such notification message is the first step to address it and thereby utilize integrity not only as a flag to report an error, but also as a means to correct such errors. This is one gap the examples described herein cover.

Moreover, referring to the agreement, DNU flags are provided by each TRP and for each error source to the LMF. However, at the moment there is no reference in the standardization work or in prior art about extending the DNU flags to PRUs, such that they can also provide PRU-related information to the LMF. In particular, as just described above, PRUs may be very useful in detecting possible causes in TRPs'/PRUs' beam misalignment. This is another gap the examples described herein fill.

The examples described herein consist of a set of protocols and signaling to enhance positioning integrity operations by leveraging PRU measurements in a standardized wireless network. However, current standards do not allow to operate by leveraging this opportunity, that can be only exploited with monolithic solutions by a unique vendor. With the evolution of 5G localization and the inclusion of sidelink positioning, common protocols and signaling are needed to allow cooperation of different entities for integrity purposes.

As high-level description, described herein is an integrity management function (IMF) for managing all the operations related to positioning integrity.

Moreover, described herein are the following main signalling exchanges among the different entities (1-3):

1. Protocol and signaling between LMF and IMF for requesting and providing positioning integrity results.
2. Protocol and signaling between IMF and PRUs for requesting and providing PRU information (used for performing positioning integrity operations).
3. Protocol and signaling between IMF and gNBs for requesting and providing gNB information (used for performing positioning integrity operations).

The new procedures and signaling described herein, with the following outline (1-4): 1. Introduction of a new MF for integrity-related operations, 2. Description of the new procedures among the already existing LMF and the new IMF, 3. Description of the new information elements (IEs) exchanged by the MFs, 4. Integrity operations performed by IMF, and 5. Description of all possible configurations for the new IMF.

1. Integrity Management Function (IMF)

Previously described with reference to FIG. 2, FIG. 3, and FIG. 4 are the main entities involved in the RAT-dependent positioning. In order to introduce the necessary signaling for providing positioning integrity using PRU (and gNB) measurements, considered is the following additional IMF that manages all the operations needed for computing the integrity results using the information coming from PRUs and gNBs. This function can be implemented in a standalone network entity or in these two existing network entities: As part of a UE, or as part of the LMF.

2. High Level Procedures

Figure 5:
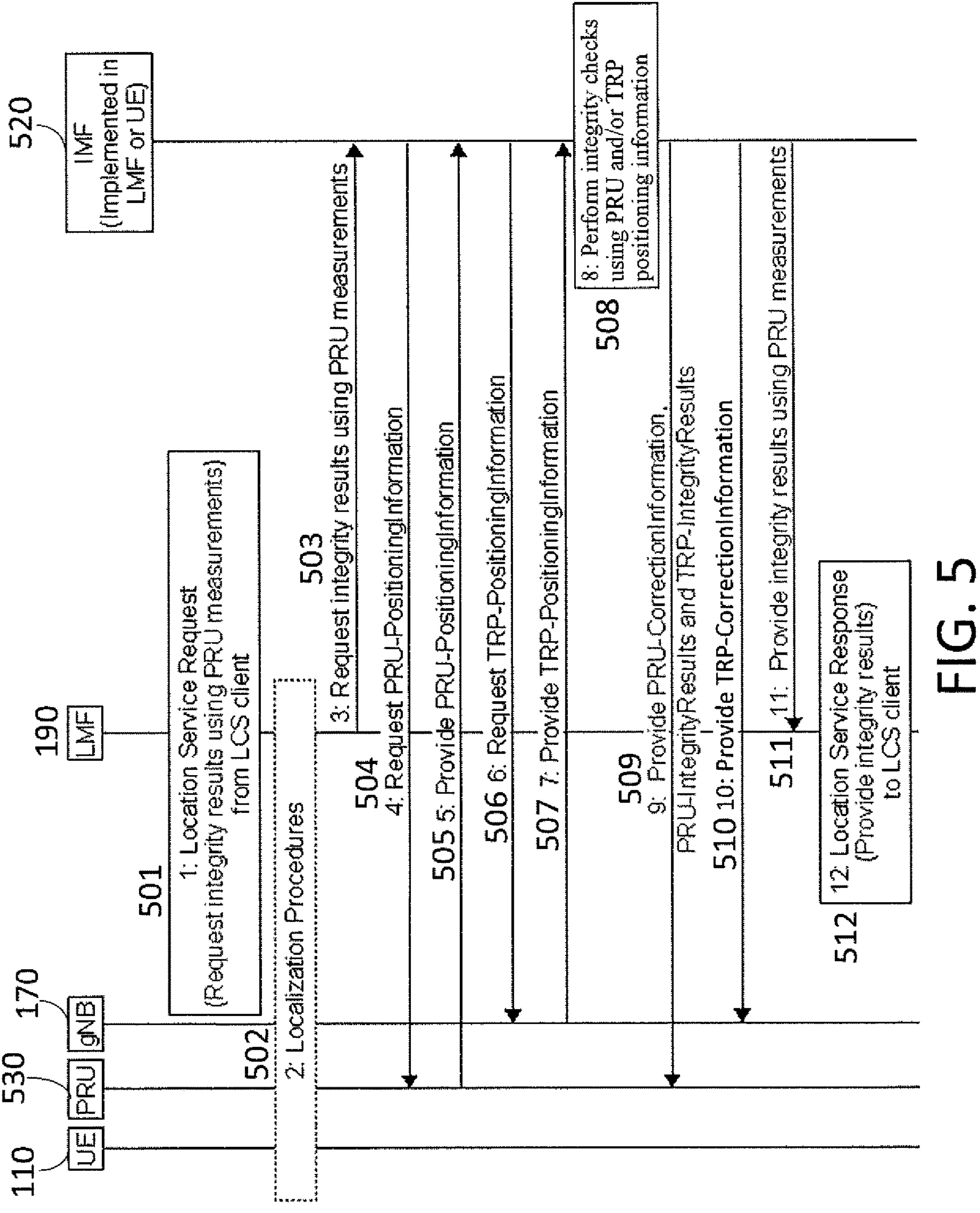
FIG. 5 shows a high level procedure for integrity operations using PRU measurements among the LMF, IMF, PRUS, and gNBs.

FIG. 5 shows the high level procedure for integrity operations using PRU measurements among LMF 190, IMF 520, PRUs (such as PRU 530), and gNBs (such as gNB 170). As introduced above, the IMF 520 can be implemented in different entities of the existing positioning architecture of FIG. 5. However, regardless of where the IMF 520 is implemented, the message exchanges among them are structured as follows with reference to FIG. 5.

1 (501). LMF receives a "Request integrity results using PRU measurements" IE from the LCS client, as part of the "Location Service Request" message; the LCS client could be a UE, a PRU, or the LMF itself.

2 (502). Active localization procedure takes place among LMF, PRUs and gNBs;

3 (503). LMF forwards the "Request Integrity Results using PRU measurements" IE to IMF.

4 (504). IMF sends "Request PRU-PositioningInformation" IE to PRUs.

5 (505). PRUs sends a "Provide PRU-PositioningInformation" IE to IMF.

6 (506). IMF sends a "Requests TRP-PositioningInformation" IE to gNBs;

7 (507). gNBs sends a "Provide TRP-PositioningInformation" IE to IMF 8 (508). IMF performs all the integrity-related operations using the received information.

9 (509). IMF sends a "Provide PRU-CorrectionInformation, PRU-IntegrityResults and TRP-IntegrityResults" IE to PRUs.

10 (510). IMF sends a "Provide TRP-CorrectionInformation" IE to gNBs.

11 (511). IMF sends a "Provide integrity results using PRU measurements" IE to LMF.

12 (512). LMF forwards the "Provide integrity results using PRU measurements" IE to LCS client, as part of the "Location Service Response" message.

In the following, 3. (Content of information elements) provides a detailed description of all the IEs and fields within these IEs (steps 1 (501), 4 (504), 5 (505), 6 (506), 7 (507), 9 (509), 10 (510), 11 (511)), 4. (Integrity operations performed by IMF) provides an explanation of the operation done at the IMF to perform the integrity checks (step 8 (508)), and 5. (Different protocols configurations) shows the high level procedures when IMF functions 520 are performed by UE 110 and LMF 190.

3. Content of Information Elements

Here is a detailed description of all the introduced IEs and fields within existing IEs:

Request Integrity Results Using PRU Measurements (1-3):

1. IntegrityUsingPRUMeasurementsFlag: flag to trigger integrity procedures and operations using PRU and TRPs information.
2. PRU-LocationCorrectionFlag (optional: if IntegrityUsingPRUMeasurementsFlag=True): flag to request PRU location accuracy improvement using PRU and TRPs information
3. TRP-LocationCorrectionFlag (optional: if IntegrityUsingPRUMeasurementsFlag=True): flag to request TRP location accuracy improvement using PRU and TRPs information.

Request PRU-PositioningInformation (1-3):

1. PRU-MeasurementQuantities: list of PRU information parameters requested
2. MeasurementPeriodicity (Optional): periodicity of realizations of the requested PRU-MeasurementQuantities
3. MeasurementAmount (Optional): number of realizations the requested PRU-MeasurementQuantities Provide PRU-PositioningInformation: Positioning-Related Information for a PRU within an NG-RAN Node (1-4):

1. PRU-MeasurementResult (optional: if requested in PRU-MeasurementQuantities), which may include a Timestamp, DL PRS-RSRP, DL PRS-RSRPP, DL-AOD, DL-TDOA, or Multi-cell RTT, etc.
2. PRU-SRSBeamInformation: spatial direction information of the UL SRS resources for the PRU, such as SRS azimuth angle and SRS elevation angle
3. PRU-BeamAntennaInformation: beam antenna information of the PRU, such as PRU-antenna azimuth angle, PRU-antenna elevation angle, PRU-antenna beam power profile, etc.
4. PRU-LocationInformation (optional: if requested in PRU-LocationInfromationFlag): geographical coordinates for the PRU Request TRP-PositioningInformation (1-3):

1. TRP-MeasurementQuantities: list of TRP information parameters requested
2. MeasurementPeriodicity (Optional): periodicity of realizations of the requested TRP-MeasurementQuantities
3. MeasurementAmount (Optional): number of realizations of the requested TRP-MeasurementQuantities Provide TRP-PositioningInformation: Positioning-Related Information for One TRP within an NG-RAN Node (1-4):

1. TRP-MeasurementResult (optional: if requested in TRP-MeasurementQuantities), which may include Timestamp, gNB-RxTxTimeDiff, UL-SRS-RSRP, UL-AoA, UL-RTOA, UL SRS-RSRPP, etc.
2. TRP-PRSBeamInformation: spatial direction information of the DL PRS resources for the TRP, such as PRS azimuth angle and PRS elevation angle
3. TRP-BeamAntennaInformation: beam antenna information of the TRP, such as TRP ID, TRP azimuth angle, TRP elevation angle, TRP beam power profile, etc.
4. TRP-LocationInformation: geographical coordinates for the TRP and any associated ARP(s)

Provide PRU-CorrectionInformation (1-3):

1. BeamCorrectionInformation: corrections to parameters in PRU-BeamAntennaInformation.
2. LocationCorrectionInformation: corrections to parameters in PRU-LocationInformation.
3. SRSCorrectionInformation: corrections to parameters in PRU-SRSBeamInformation.

Provide PRU-IntegrityResults Includes a PRU-IntegrityFlag (1-3):

1. MisleadingBeamInformationFlag: flag indicating whether misleading PRU-antenna beam information is detected or not by the integrity algorithms.
2. MisleadingLocationFlag: flag indicating whether misleading PRU location information is detected or not by the integrity algorithms.
3. MisleadingSRSnformationFlag: flag indicating whether misleading PRU-SRS beam information is detected or not by the integrity algorithms.

Provide TRP-CorrectionInformation (1-3):

1. BeamCorrectionInformation: corrections to parameters in TRP-Beam AntennaInformation.
2. LocationInformationCorrection: corrections to parameters in TRP-Location Information.
3. PRSCorrectionInformation: corrections to parameters in TRP-PRSBeamInformation.

Provide TRP-IntegrityResults Includes a TRP-IntegrityFlag (1-3)

1. MisleadingBeam InformationFlag: flag indicating whether misleading TRP beam information is detected or not by the integrity algorithms.
2. MisleadingLocationFlag: flag indicating whether misleading TRP location information is detected or not by the integrity algorithms.

3. MisleadingPRSnformationFlag: flag indicating whether misleading TRP-PRS beam information is detected or not by the integrity algorithms.

Provide integrity results using PRU measurements includes Provide PRU-IntegrityResults, or Provide TRP-IntegrityResults, or both Provide PRU-IntegrityResults and Provide TRP-IntegrityResults. In the described examples, Provide PRU-IntegrityResults and Provide TRP-IntegrityResults indicate an act of providing PRU integrity results and TRP integrity results, respectively, such as shown at items 509 and 511 of FIG. 5, at items 610 and 612 of FIG. 6, and at items 708 and 710 of FIG. 7. In another example, Provide PRU-IntegrityResults and Provide TRP-IntegrityResults may be information elements serving as an indication to provide PRU integrity results and TRP integrity results, respectively (transmitted for example at 503 of FIG. 5, at 603 of FIG. 6, and 701 of FIG. 7).

4. Integrity Operations Performed by IMF

This section provides an example description of which operations are performed at the IMF (step 8 (508) of FIG. 5) in order to perform the integrity checks for 1) detecting which (if any) TRP(s) and/or PRU(s) are faulty, and 2) generating corrections to be provided to the faulty entities.

First, the IMF takes as input the following positioning information coming from TRPs and PRUs: TRP-PositioningInformation (parameters described in section 3 (Content of information elements)) and PRU-PositioningInformation (parameters described in section 3 (Content of information elements)).

Then, it performs integrity operations in order to provide to PRUs and TRPs the following integrity flags and correction information: PRU-CorrectionInformation (parameters described in section 3 (Content of information elements)), PRU-IntegrityResults (parameters described in section 3 (Content of information elements)), TRP-CorrectionInformation (parameters described in section 3 (Content of information elements)), TRP-IntegrityResults (parameters described in section 3 (Content of information elements))

The integrity operations performed by the IMF to compute such information can be summarized with the following example (1-4):

1. Derive the beam orientation error for a specific TRP-ID based on RSRP measurements of PRU-1 (inside PRU-PositioningInformation IE coming from PRU-1).
2. Derive the beam orientation error for the same TRP-ID based on RSRP measurements coming of PRU-2 (inside PRU-PositioningInformation IE coming from PRU-2).
3. Compare the difference of the errors in step 1 and step 2 with a specified threshold-1.

3a. If such difference is below the threshold (i.e., both PRU-1 and PRU-2 deriving a similar beam orientation error): i) If beam orientation error derived from PRU-1 and PRU-2 is below a specified threshold-2 (i.e., small beam orientation error): 1. Send a report with TRP-IntegrityFlag (provided inside TRP-IntegrityResults IE) set to false (i.e., TRP-ID is healthy), 2. Continue to step 4), ii) Otherwise, if beam orientation error derived from PRU-1 and PRU-2 is above a specified threshold-2 (i.e., large beam orientation error): 1. Send a report with beam orientation error to the TRP-ID (provided inside TRP-CorrectionInformation IE), 2. Send a report with TRP-IntegrityFlag (provided inside TRP-IntegrityResults IE) set to true (i.e., TRP-ID is unhealthy), 3. Continue to step 4).

3b. Otherwise, if such difference is above the threshold (i.e., PRU-1 deriving a small beam orientation error and PRU-2 deriving a big error, or vice versa), there is a RSRP measurement error on either PRU-1 or PRU-2. To understand which PRU-ID is providing wrong measurements: i. Derive the beam orientation error for the same TRP-ID based on RSRP measurements of PRU-3, ii. Extract the correlation of the RSRP measurements among all the different pairs of the three PRUs: Corr-RSRP-12, Corr-RSRP-13, and Corr-RSRP-23, iii. Extract the PRU-ID which has the least correlation with the other PRUs measurements (e.g., if Corr-RSRP-12<Corr-RSRP-13<Corr-RSRP-23, then RSRP measurements from PRU-1 have low correlation with those of PRU-2 and PRU-3), iv. Send a report with the RSRP measurement error to the PRU-ID (provided inside PRU-CorrectionInformation IE (step 9 (509) of FIG. 5)), v. Send a report with PRU-IntegrityFlag (provided inside PRU-IntegrityResults IE) set to true (i.e., PRU-ID is unhealthy), vi. Continue to step 4).

4. Conclude the integrity operations

It should be noted that this example is just a possible embodiment of the operations done by the IMF. Other possible algorithms could be applied to the inputs provided to the IMF in order to derive such integrity results and correction information.

5. Different protocols configurations

Given the high level procedure and the IEs described above, there are at least two possible combinations of where the IMF can be implemented within the existing 5G positioning architecture, with different specification impacts. In particular, the implementation options may be divided into two groups (1-2):

1. New signaling and IEs needed: IMF is implemented in UE, Sidelink Positioning Protocol (SLPP) is used among UE and PRU (see FIG. 6 with Option 1).
2. Reusable signaling from TS 38.305 and IEs from TS 37.355, but new signaling and IEs still possible IMF is implemented in UE, SLPP is used among UE and PRU (scc FIG. 6 with Option 1), or IMF is implemented in LMF (see FIG. 7).

The reusage of existing LPP and NRPPa protocols might be possible. In this case, the introduction of new IEs within existing messages is necessary.

All changes related to LPP messages impact TS 37.355; all changes related to NRPPa messages impact TS 38.455; all changes related to messages from/to LCS client impact TS 23.273.

Figure 6:
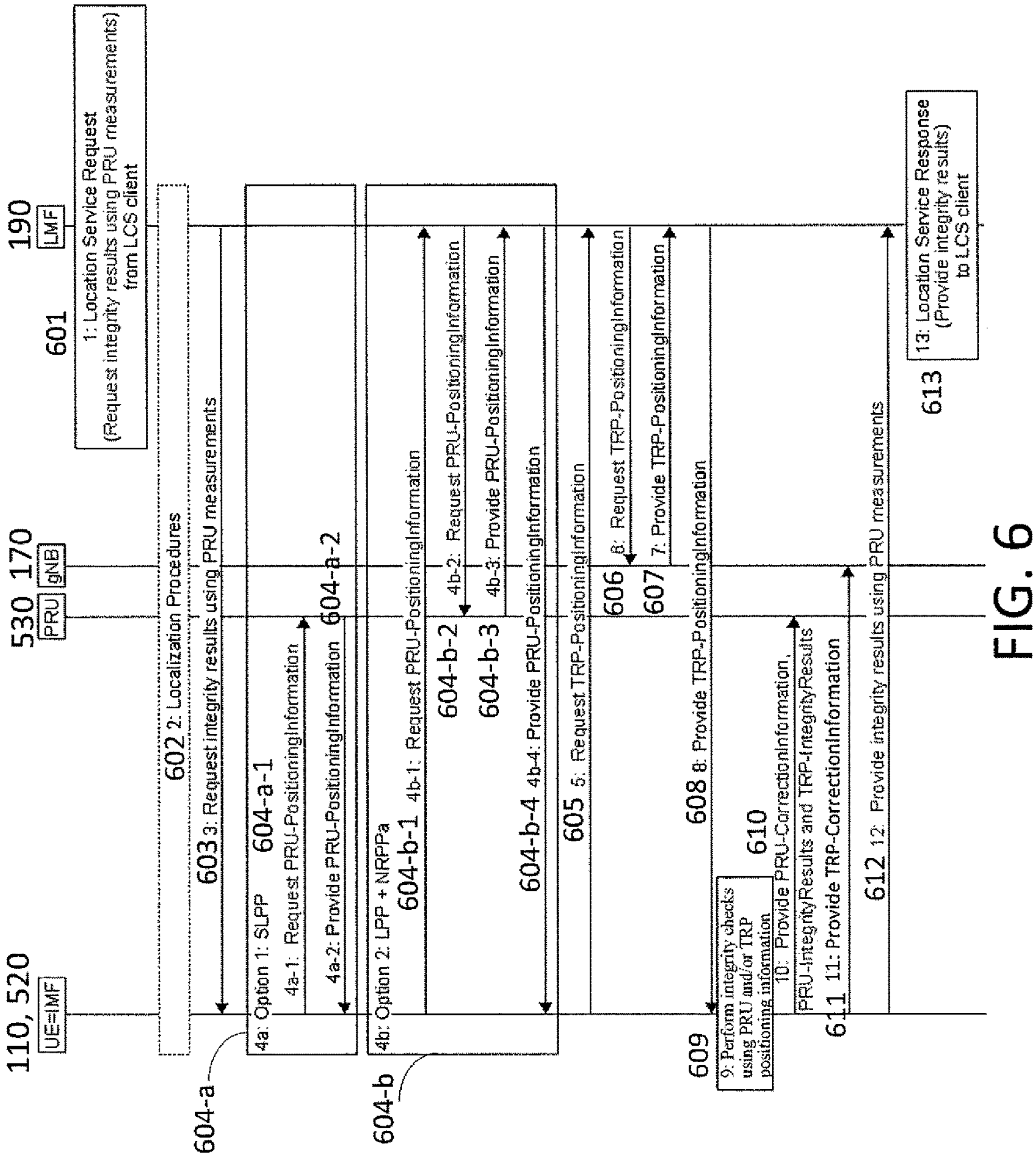
FIG. 6 shows the procedure for integrity operations when the IMF is implemented in a UE.

FIG. 6 shows the procedure for integrity operations when IMF is implemented in UE. Option 1 requires a new protocol between UE and PRU.

At 601, the LMF 190 receives a location services request from an LCS client, and prepares to transmit a request for integrity results using PRU measurements. The LMF 190 may also receive at 601 a request from the LCS client for integrity results using PRU measurements. At 602, the UE 110 implementing the IMF 520, the PRU 530, the gNB 170, and the LMF 190 participate in localization procedures. At 603, the LMF 190 transmits to the UE 110 implementing the IMF 520 the request for integrity results using PRU measurements. Option 1 604-*a* includes items 604-*a*-1 and item 604-*a*-2. At 604-*a*-1, the UE 110 implementing the IMF 520 transmits to the PRU 530 a request for PRU positioning information. At 604-*a*-2, the PRU 530 transmits to the UE 110 implementing the IMF 520 the PRU positioning information. Option 2 604-*b* includes items 604-*b*-1, 604-*b*-2, 604-*b*-3, and 604-*b*-4. At 604-*b*-1, the UE 110 implementing the IMF 520 transmits to the LMF 190 a request for PRU positioning information. At 604-*b*-2, the IMF 190 transmits to the PRU 530 a request for PRU positioning information. At 604-*b*-3, the PRU 530 transmits to the LMF 190 the PRU positioning information. At 604-*b*-4, the LMF 190 transmits to the UE 110 implementing the IMF 520 the PRU positioning information (e.g. received at 604-*b*-3).

At 605, the UE 110 implementing the IMF 520 transmits to the LMF 190 a request for TRP positioning information. At 606, the LMF 190 transmits to the gNB 170 a request for TRP positioning information. At 607, the gNB 170 transmits to the LMF the TRP positioning information. At 608, the LMF 190 transmits to the UE 110 implementing the IMF 520 the TRP positioning information (e.g. that was received at 607). At 609, the UE 110 implementing the IMF 520 performs integrity checks. At 610, the UE 110 implementing the IMF 520 transmits to the PRU 530 PRU correction information, PRU integrity results and TRP integrity results. At 611, the UE 110 implementing the IMF 520 transmits to the gNB 170 TRP correction information. At 612, the UE 110 implementing the IMF 520 transmits to the LMF 190 integrity results using PRU measurements. At 613, the LMF 190 provides the integrity results received at 612 to the LCS client, and transmits to the LCS client a response to the location services request.

Figure 7:
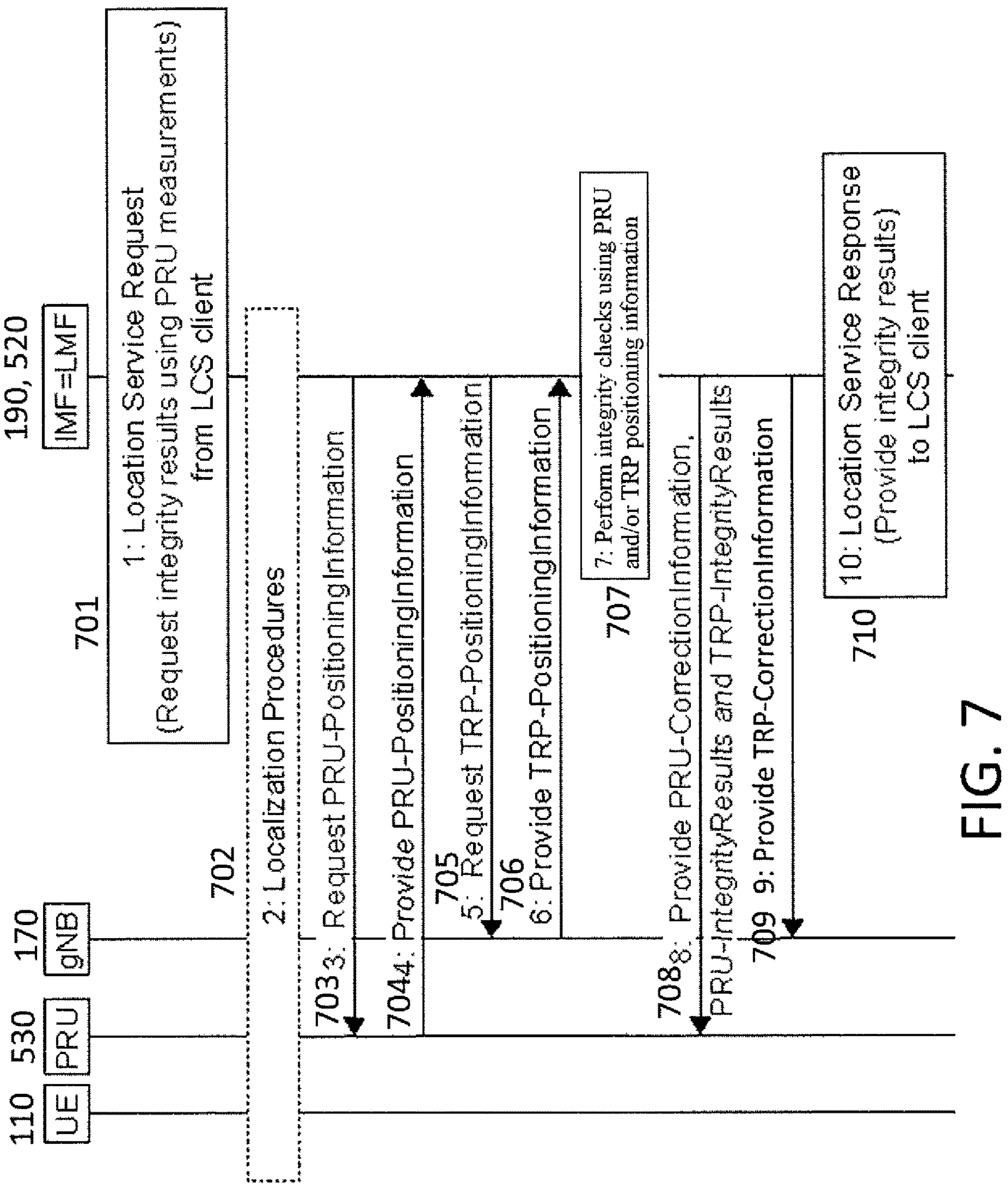
FIG. 7 shows the procedure for integrity operations when the IMF is implemented in the LMF.

FIG. 7 shows the procedure for integrity operations when IMF 520 is implemented in LMF 190. At 701, the LMF 190 implementing the IMF 520 receives a location services request from an LCS client. The LMF 190 implementing the IMF 520 may also receive at 701 a request from the LCS client for integrity results using PRU measurements. At 702, the UE 110, the PRU 530, the gNB 170, and the LMF 190 implementing the IMF 520 participate in localization procedures. At 703, the LMF 190 implementing the IMF 520 transmits to the PRU 530 a request for PRU positioning information. At 704, the PRU 530 transmits to the LMF 190 implementing the IMF 520 PRU positioning information. At 705, the LMF 190 implementing the IMF 520 transmits to the gNB 170 a request for TRP positioning information. At 706, the gNB 170 transmits to the LMF 190 implementing the IMF 520 the TRP positioning information. At 707, the LMF 190 implementing the IMF 520 performs integrity checks. At 708, the LMF 190 implementing the IMF 520 transmits to the PRU 530 PRU correction information, PRU integrity results and TRP integrity results. At 709, the LMF 190 implementing the IMF 520 transmits to the gNB 170 TRP correction information. At 710, the LMF 190 implementing the IMF 520 transmits to the LCS client a response to the location services request. The LMF 190 implementing the IMF 520 also at 710 may provide the integrity results determined at 707 to the LCS client.

The examples described herein involve new standard procedures and signaling.

Figure 8:
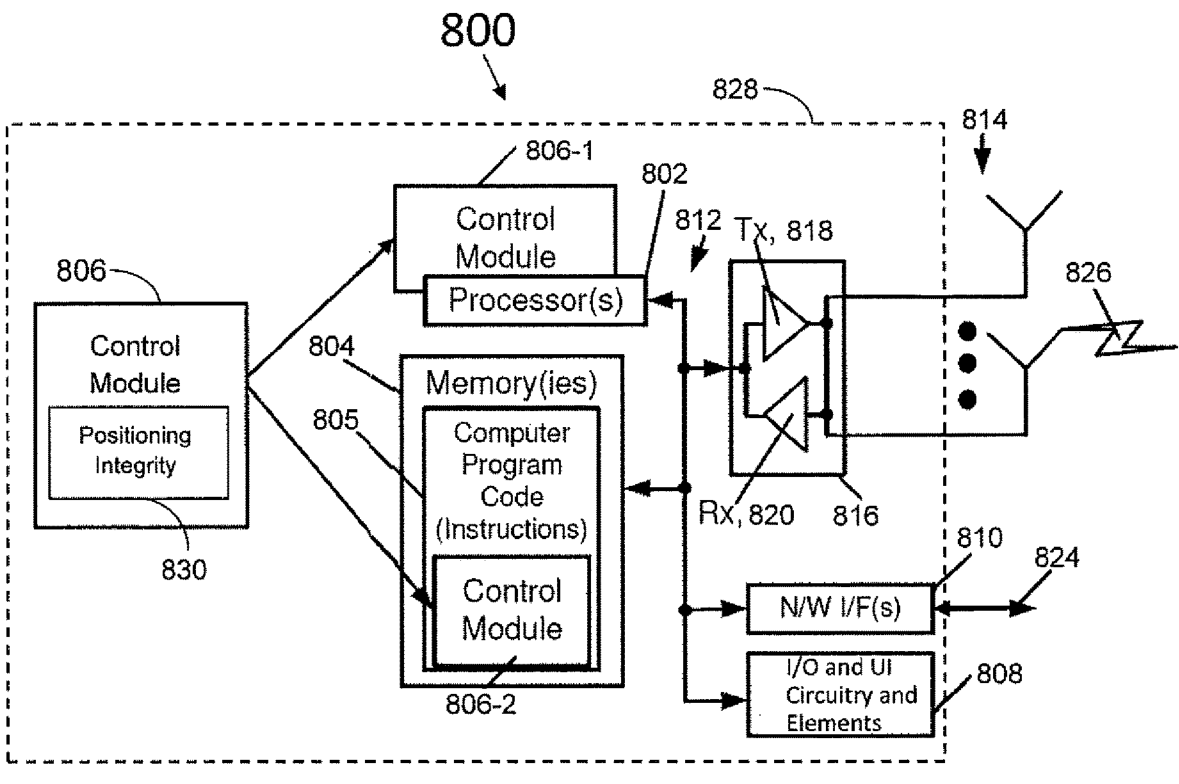
FIG. 8 is an example apparatus configured to implement the examples described herein.

FIG. 8 is an example apparatus 800, which may be implemented in hardware, configured to implement the examples described herein. The apparatus 800 comprises at least one processor 802 (e.g. an FPGA and/or CPU), one or more memories 804 including computer program code 805, the computer program code 805 having instructions to carry out the methods described herein, wherein the at least one memory 804 and the computer program code 805 are configured to, with the at least one processor 802, cause the apparatus 800 to implement circuitry, a process, component, module, or function (implemented with control module 806) to implement the examples described herein. The memory 804 may be a non-transitory memory, a transitory memory, a volatile memory (e.g. RAM), or a non-volatile memory (e.g. ROM). Positioning integrity 830 of the control module implements the herein described aspects related to positioning integrity.

The apparatus 800 includes a display and/or I/O interface 808, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 800 includes one or more communication e.g. network (N/W) interfaces (I/I(s)) 810. The communication I/F(s) 810 may be wired and/or wireless and communicate over the Internet/other network (s) via any communication technique including via one or more links 824. The link(s) 824 may be the link(s) 131 and/or 176 from FIG. 1. The link(s) 131 and/or 176 from FIG. 1 may also be implemented using transceiver(s) 816 and corresponding wireless link(s) 826. The communication I/F(s) 810 may comprise one or more transmitters or one or more receivers.

The transceiver 816 comprises one or more transmitters 818 and one or more receivers 820. The transceiver 816 and/or communication I/F(s) 810 may comprise standard well-known components such as an amplifier, filter, frequency-converter, (de) modulator, and encoder/decoder circuitries and one or more antennas, such as antennas 814 used for communication over wireless link 826.

The control module 806 of the apparatus 800 comprises one of or both parts 806-1 and/or 806-2, which may be implemented in a number of ways. The control module 806 may be implemented in hardware as control module 806-1, such as being implemented as part of the one or more processors 802. The control module 806-1 may be implemented also as an integrated circuit or through other hardware such as a programmable gate array. In another example, the control module 806 may be implemented as control module 806-2, which is implemented as computer program code (having corresponding instructions) 805 and is executed by the one or more processors 802. For instance, the one or more memories 804 store instructions that, when executed by the one or more processors 802, cause the apparatus 800 to perform one or more of the operations as described herein. Furthermore, the one or more processors 802, the one or more memories 804, and example algorithms (e.g., as flowcharts and/or signaling diagrams), encoded as instructions, programs, or code, are means for causing performance of the operations described herein.

The apparatus 800 to implement the functionality of control 806 may be UE 110, RAN node 170 (e.g. gNB), or network element(s) 190 (e.g. LMF 190). Thus, processor 802 may correspond to processor(s) 120, processor(s) 152 and/or processor(s) 175, memory 804 may correspond to one or more memories 125, one or more memories 155 and/or one or more memories 171, computer program code 805 may correspond to computer program code 123, computer program code 153, and/or computer program code 173, control module 806 may correspond to module 140-1, module 140-2, module 150-1, and/or module 150-2, and communication I/F(s) 810 and/or transceiver 816 may correspond to transceiver 130, antenna(s) 128, transceiver 160, antenna(s) 158, N/W I/F(s) 161, and/or N/W I/F(s) 180. Alternatively, apparatus 800 and its elements may not correspond to either of UE 110, RAN node 170, or network element(s) 190 and their respective elements, as apparatus 800 may be part of a self-organizing/optimizing network (SON) node or other node, such as a node in a cloud.

Apparatus 800 may also correspond to PRU 530.

The apparatus 800 may also be distributed throughout the network (e.g. 100) including within and between apparatus 800 and any network element (such as a network control element (NCE) 190 and/or the RAN node 170 and/or UE 110).

Interface 812 enables data communication and signaling between the various items of apparatus 800, as shown in FIG. 8. For example, the interface 812 may be one or more buses such as address, data, or control buses, and may include any interconnection mechanism, such as a series of lines on a motherboard or integrated circuit, fiber optics or other optical communication equipment, and the like. Computer program code (e.g. instructions) 805, including control 806 may comprise object-oriented software configured to pass data or messages between objects within computer program code 805. The apparatus 800 need not comprise each of the features mentioned, or may comprise other features as well. The various components of apparatus 800 may at least partially reside in a common housing 828, or a subset of the various components of apparatus 800 may at least partially be located in different housings, which different housings may include housing 828.

Figure 9:
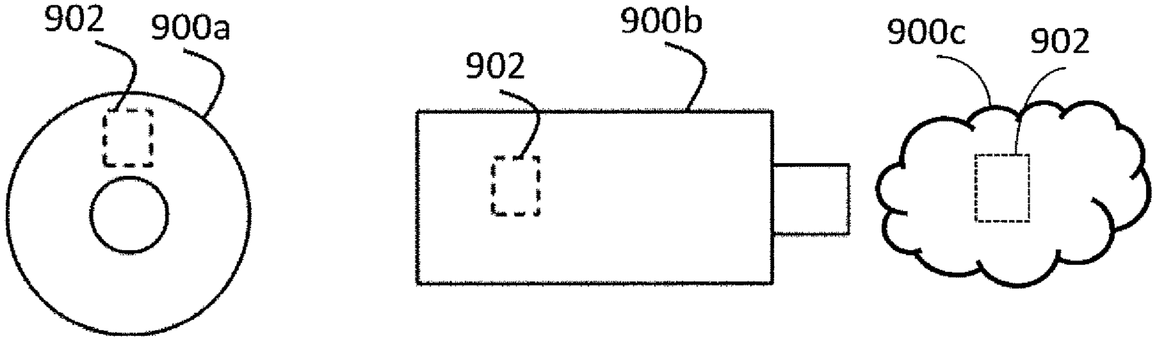
FIG. 9 shows a representation of an example of non-volatile memory media used to store instructions that implement the examples described herein.

FIG. 9 shows a schematic representation of non-volatile memory media 900*a* (e.g. computer/compact disc (CD) or digital versatile disc (DVD)) and 900*b* (e.g. universal serial bus (USB) memory stick) and 900*c* (e.g. cloud storage for downloading instructions and/or parameters 902 or receiving emailed instructions and/or parameters 902) storing instructions and/or parameters 902 which when executed by a processor allows the processor to perform one or more of the steps of the methods described herein. Instructions and/or parameters 902 may represent a non-transitory computer readable medium.

Figure 10:
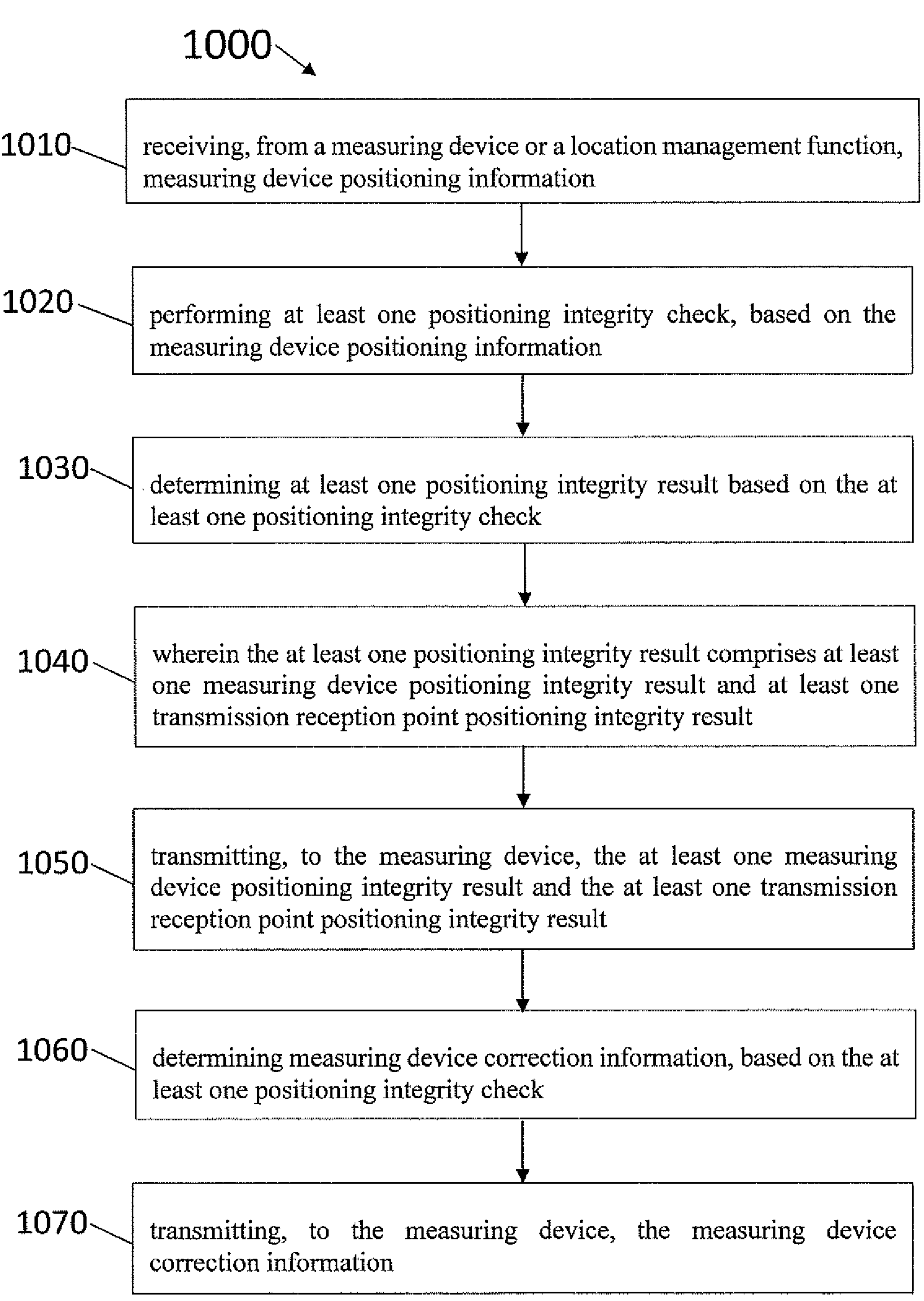
FIG. 10 is an example method, based on the examples described herein.

FIG. 10 is an example method 1000, based on the example embodiments described herein. At 1010, the method includes receiving, from a measuring device or a location management function, measuring device positioning information. At 1020, the method includes performing at least one positioning integrity check, based on the measuring device positioning information. At 1030, the method includes determining at least one positioning integrity result based on the at least one positioning integrity check. At 1040, the method includes wherein the at least one positioning integrity result comprises at least one measuring device positioning integrity result and at least one transmission reception point positioning integrity result. At 1050, the method includes transmitting, to the measuring device, the at least one measuring device positioning integrity result and the at least one transmission reception point positioning integrity result. At 1060, the method includes determining measuring device correction information, based on the at least one positioning integrity check. At 1070, the method includes transmitting, to the measuring device, the measuring device correction information. Method 1000 may be performed with UE 110, one or more network elements 190 (e.g. LMF 190), IMF 520, or apparatus 800.

Figure 11:
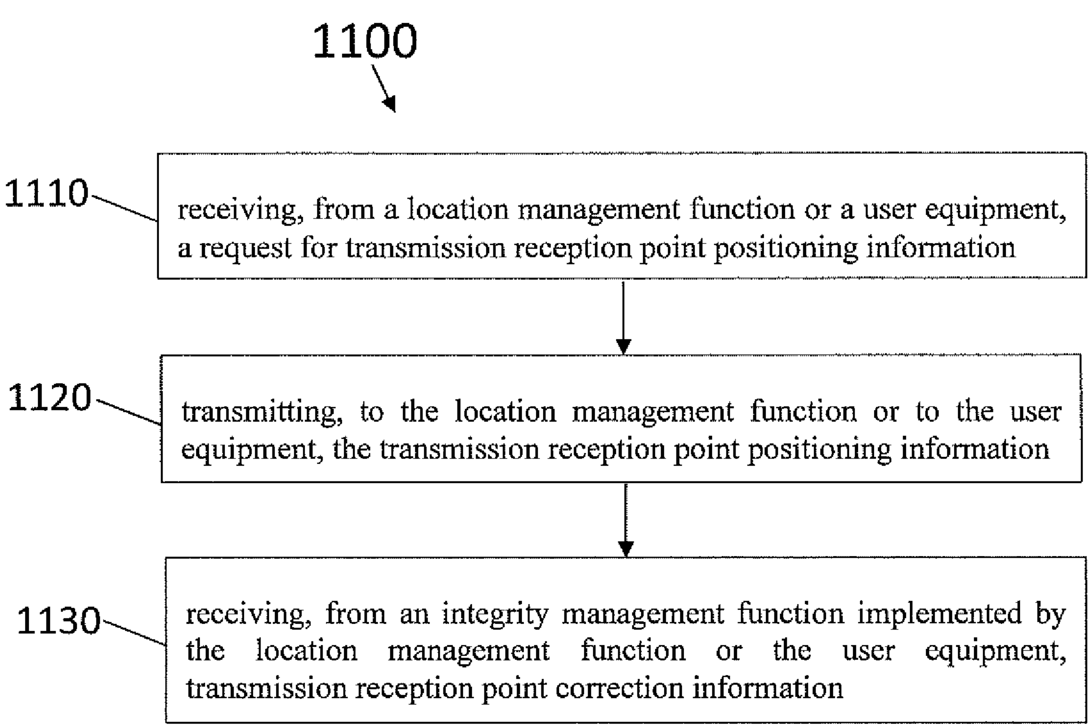
FIG. 11 is an example method, based on the examples described herein.

FIG. 11 is an example method 1100, based on the example embodiments described herein. At 1110, the method includes receiving, from a location management function or a user equipment, a request for transmission reception point positioning information. At 1120, the method includes transmitting, to the location management function or to the user equipment, the transmission reception point positioning information. At 1130, the method includes receiving, from an integrity management function implemented by the location management function or the user equipment, transmission reception point correction information. Method 1100 may be performed with RAN node 170 (e.g. gNB 170) or apparatus 800.

Figure 12:
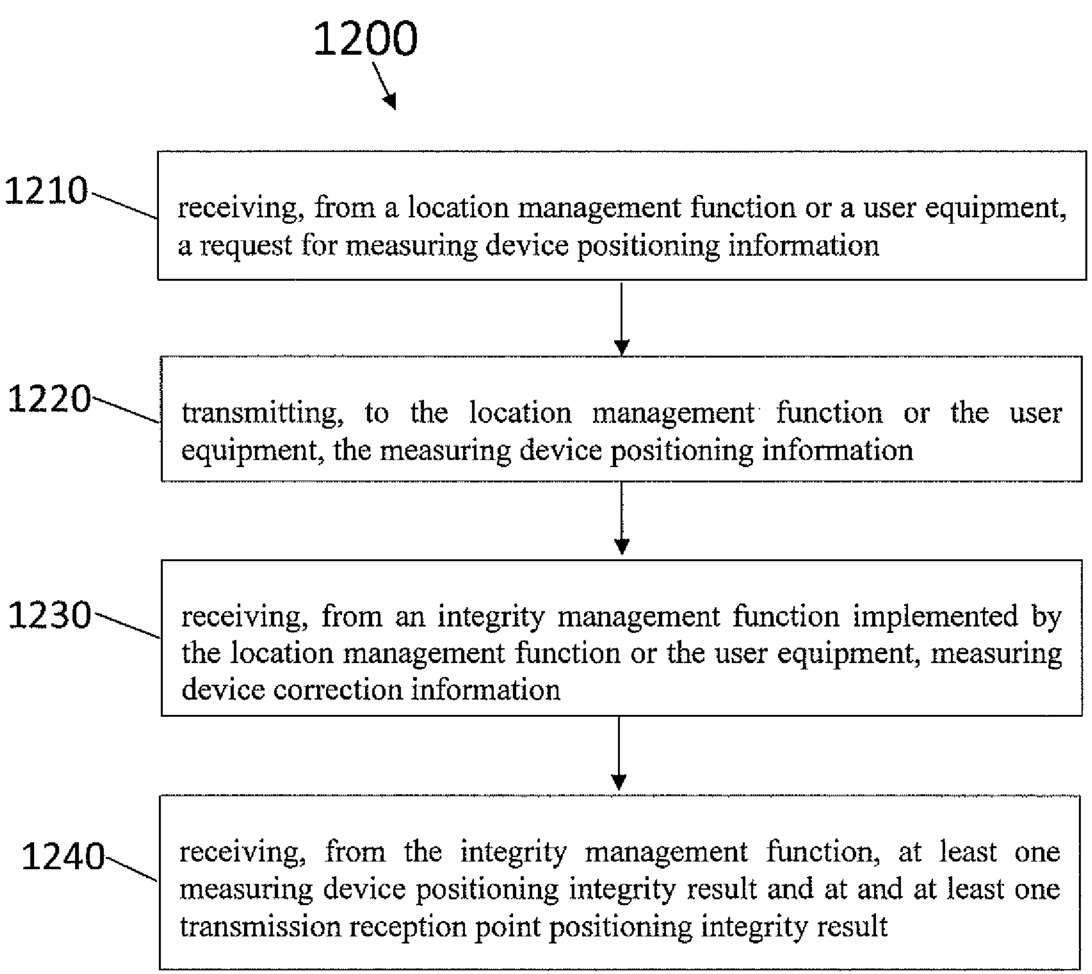
FIG. 12 is an example method, based on the examples described herein.

FIG. 12 is an example method 1200, based on the example embodiments described herein. At 1210, the method includes receiving, from a location management function or a user equipment, a request for measuring device positioning information. At 1220, the method includes transmitting, to the location management function or the user equipment, the measuring device positioning information. At 1230, the method includes receiving, from an integrity management function implemented by the location management function or the user equipment, measuring device correction information. At 1240, the method includes receiving, from the integrity management function, at least one measuring device positioning integrity result and at and at least one transmission reception point positioning integrity result. Method 1200 may be performed with UE 110, PRU 530, or apparatus 800.

Figure 13:
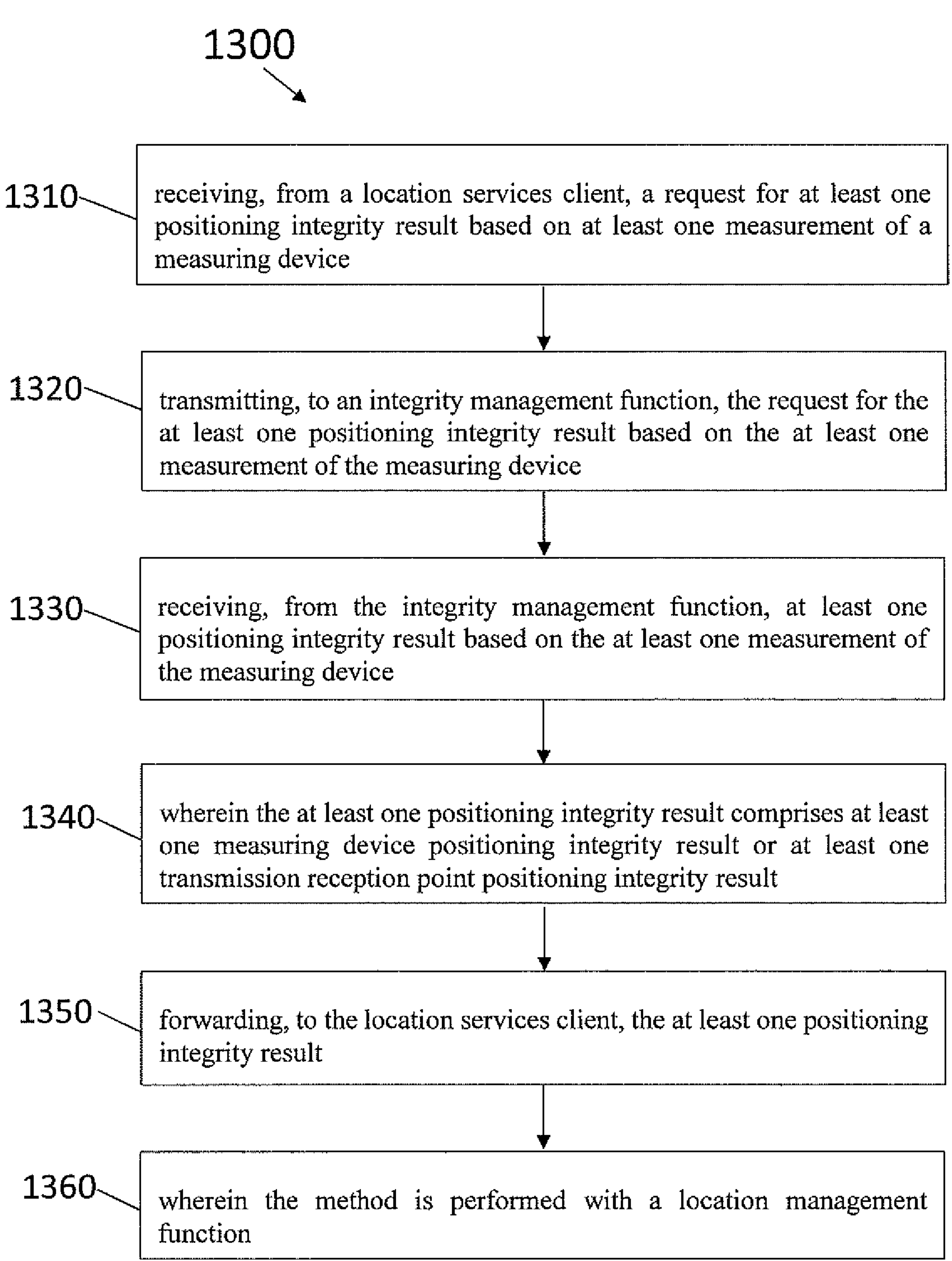
FIG. 13 is an example method, based on the examples described herein.

FIG. 13 is an example method 1300, based on the example embodiments described herein. At 1310, the method includes receiving, from a location services client, a request for at least one positioning integrity result based on at least one measurement of a measuring device. At 1320, the method includes transmitting, to an integrity management function, the request for the at least one positioning integrity result based on the at least one measurement of the measuring device. At 1330, the method includes receiving, from the integrity management function, at least one positioning integrity result based on the at least one measurement of the measuring device. At 1340, the method includes wherein the at least one positioning integrity result comprises at least one measuring device positioning integrity result or at least one transmission reception point positioning integrity result. At 1350, the method includes forwarding, to the location services client, the at least one positioning integrity result. At 1360, the method includes wherein the method is performed with a location management function. Method 1300 may be performed with one or more network elements 190 (e.g. LMF 190) or apparatus 800.

The following examples are provided and described herein.

Example 1. An apparatus including: at least one processor; and at least one non-transitory memory storing instructions that, when executed by the at least one processor, cause the apparatus at least to: receive, from a measuring device or a location management function, measuring device positioning information; perform at least one positioning integrity check, based on the measuring device positioning information; determine at least one positioning integrity result based on the at least one positioning integrity check; wherein the at least one positioning integrity result comprises at least one measuring device positioning integrity result and at least one transmission reception point positioning integrity result; transmit, to the measuring device, the at least one measuring device positioning integrity result and the at least one transmission reception point positioning integrity result; determine measuring device correction information, based on the at least one positioning integrity check; and transmit, to the measuring device, the measuring device correction information.

Example 2. The apparatus of example 1, wherein the instructions, when executed by the at least one processor, cause the apparatus at least to: receive, from the location management function, a request for the at least one positioning integrity result; and transmit, to the location management function, the at least one positioning integrity result.

Example 3. The apparatus of example 2, wherein the request for the at least one positioning integrity result received from the location management function comprises at least one or more of: an indication to perform the at least one positioning integrity check using the measuring device positioning information and transmission reception point positioning information, or an indication of a request to provide measuring device location accuracy improvement information using the measuring device positioning information and the transmission reception point positioning information, or an indication of a request to provide transmission reception point location accuracy improvement information using the measuring device positioning information and the transmission reception point positioning information.

Example 4. The apparatus of any of examples 1 to 3, wherein the measuring device correction information transmitted to the measuring device comprises at least one or more of: beam correction information comprising a correction to at least one parameter related to beam antenna information of the measuring device, wherein the beam antenna information comprises beam direction information, a beam power profile, or other information, or location correction information comprising a correction to at least one parameter related to location information of the measuring device, or beam correction information comprising a correction to at least one parameter related to sounding reference signal beam information of the measuring device.

Example 5. The apparatus of any of examples 1 to 4, wherein the instructions, when executed by the at least one processor, cause the apparatus at least to: determine transmission reception point correction information, based on the at least one positioning integrity check; and transmit, to a radio access network node, the transmission reception point correction information.

Example 6. The apparatus of example 5, wherein the transmission reception point correction information transmitted to the radio access network node comprises at least one or more of: beam correction information comprising a correction to at least one parameter related to beam antenna information of the radio access network node, wherein the beam antenna information comprises beam direction information, a beam power profile, or other information, or location correction information comprising a correction to at least one parameter related to location information of the radio access network node, or beam correction information comprising a correction to at least one parameter related to positioning reference signal beam information of the radio access network node.

Example 7. The apparatus of any of examples 1 to 6, wherein the at least one measuring device positioning integrity result comprises at least one or more of: an indication of whether inaccurate measuring device beam antenna information has been detected or not by the apparatus, wherein the beam antenna information comprises beam direction information, a beam power profile, or other information, or an indication of whether inaccurate measuring device location information has been detected or not by the apparatus, or an indication of whether inaccurate measuring device sounding reference signal beam information has been detected or not by the apparatus.

Example 8. The apparatus of any of examples 1 to 7, wherein the at least one transmission reception point positioning integrity result comprises at least one or more of: an indication of whether inaccurate transmission reception point beam antenna information has been detected or not by the apparatus, wherein the beam antenna information comprises beam direction information, a beam power profile, or other information, or an indication of whether inaccurate transmission reception point location information has been detected or not by the apparatus, or an indication of whether inaccurate transmission reception point positioning reference signal beam information has been detected or not by the apparatus.

Example 9. The apparatus of any of examples 1 to 8, wherein the instructions, when executed by the at least one processor, cause the apparatus at least to: request, from the measuring device or the location management function, the measuring device positioning information.

Example 10. The apparatus of example 9, wherein the request for the measuring device positioning information transmitted to the measuring device or the location management function comprises at least one or more of: measuring device measurement quantities comprising a list of requested measuring device information parameters, or a measurement periodicity comprising a periodicity of realizations of the requested measuring device measurement quantities, or a measurement amount comprising a number of realizations of the requested measuring device measurement quantities.

Example 11. The apparatus of any of examples 1 to 10, wherein the instructions, when executed by the at least one processor, cause the apparatus at least to: request, from a radio access network node or the location management function, transmission reception point positioning information; receive, from the radio access network node or the location management function, the transmission reception point positioning information; wherein the at least one positioning integrity check is performed based on the transmission reception point positioning information.

Example 12. The apparatus of example 11, wherein the request for the transmission reception point positioning information transmitted to the radio access network node or the location management function comprises at least one or more of: transmission reception point measurement quantities comprising a list of requested transmission reception point information parameters, or a measurement periodicity comprising a periodicity of realizations of the requested transmission reception point measurement quantities, or a measurement amount comprising a number of realizations of the requested transmission reception point measurement quantities.

Example 13. The apparatus of any of examples 1 to 12, wherein the instructions, when executed by the at least one processor, cause the apparatus at least to: receive, from a location services client, a request for the at least one positioning integrity result; and forward, to the location services client, the at least one positioning integrity result.

Example 14. The apparatus of any of examples 1 to 13, wherein: the apparatus comprises an integrity management function implemented by a user equipment or a location management function; and the measuring device comprises a positioning reference unit.

Example 15. An apparatus including: at least one processor; and at least one non-transitory memory storing instructions that, when executed by the at least one processor, cause the apparatus at least to: receive, from a location management function or a user equipment, a request for transmission reception point positioning information; transmit, to the location management function or to the user equipment, the transmission reception point positioning information; and receive, from an integrity management function implemented by the location management function or the user equipment, transmission reception point correction information.

Example 16. The apparatus of example 15, wherein the transmission reception point correction information received from the integrity management function comprises at least one or more of: beam correction information comprising a correction to at least one parameter related to beam antenna information of the apparatus, wherein the beam antenna information comprises beam direction information, a beam power profile, or other information, or location correction information comprising a correction to at least one parameter related to location information of the apparatus, or beam correction information comprising a correction to at least one parameter related to positioning reference signal beam information of the apparatus.

Example 17. The apparatus of any of examples 15 to 16, wherein the apparatus comprises a radio access network node.

Example 18. An apparatus including: at least one processor; and at least one non-transitory memory storing instructions that, when executed by the at least one processor, cause the apparatus at least to: receive, from a location management function or a user equipment, a request for measuring device positioning information; transmit, to the location management function or the user equipment, the measuring device positioning information; receive, from an integrity management function implemented by the location management function or the user equipment, measuring device correction information; and receive, from the integrity management function, at least one measuring device positioning integrity result and at and at least one transmission reception point positioning integrity result.

Example 19. The apparatus of example 18, wherein the measuring device correction information received from the integrity management function comprises at least one or more of: beam correction information comprising a correction to at least one parameter related to beam antenna information of the apparatus, wherein the beam antenna information comprises beam direction information, a beam power profile, or other information, or location correction information comprising a correction to at least one parameter related to location information of the apparatus, or beam correction information comprising a correction to at least one parameter related to sounding reference signal beam information of the apparatus.

Example 20. The apparatus of any of examples 18 to 19, wherein the apparatus comprises a measuring device, and the measuring device comprises a positioning reference unit.

Example 21. An apparatus including: at least one processor; and at least one non-transitory memory storing instructions that, when executed by the at least one processor, cause the apparatus at least to: receive, from a location services client, a request for at least one positioning integrity result based on at least one measurement of a measuring device; transmit, to an integrity management function, the request for the at least one positioning integrity result based on the at least one measurement of the measuring device; receive, from the integrity management function, at least one positioning integrity result based on the at least one measurement of the measuring device; wherein the at least one positioning integrity result comprises at least one measuring device positioning integrity result or at least one transmission reception point positioning integrity result; and forward, to the location services client, the at least one positioning integrity result; wherein the apparatus comprises a location management function.

Example 22. The apparatus of example 21, wherein the at least one measuring device positioning integrity result received from the integrity management function comprises at least one or more of: an indication of whether inaccurate measuring device beam antenna information has been detected or not by the integrity management function, wherein the beam antenna information comprises beam direction information, a beam power profile, or other information, or an indication of whether inaccurate measuring device location information has been detected or not by the integrity management function, or an indication of whether inaccurate measuring device sounding reference signal beam information has been detected or not by the integrity management function.

Example 23. The apparatus of any of examples 21 to 22, wherein the at least one transmission reception point positioning integrity result received from the integrity management function comprises at least one or more of: an indication of whether inaccurate transmission reception point beam antenna information has been detected or not by the integrity management function, wherein the beam antenna information comprises beam direction information, a beam power profile, or other information, or an indication of whether inaccurate transmission reception point location information has been detected or not by the integrity management function, or an indication of whether inaccurate transmission reception point positioning reference signal beam information has been detected or not by the integrity management function.

Example 24. The apparatus of any of examples 21 to 23, wherein the instructions, when executed by the at least one processor, cause the apparatus at least to: receive, from the integrity management function, a request for measuring device positioning information; transmit, to the integrity management function, the measuring device positioning information; wherein the at least one positioning integrity result is based on the measuring device positioning information transmitted to the integrity management function; receive, from the integrity management function, a request for transmission reception point positioning information; and transmit, to the integrity management function, the transmission reception point positioning information; wherein the at least one positioning integrity result is based on the transmission reception point positioning information transmitted to the integrity management function.

Example 25. The apparatus of example 24, wherein the instructions, when executed by the at least one processor, cause the apparatus at least to: transmit, to a measuring device, the request for the measuring device positioning information; and receive, from the measuring device, the measuring device positioning information.

Example 26. A method including: receiving, from a measuring device or a location management function, measuring device positioning information; performing at least one positioning integrity check, based on the measuring device positioning information; determining at least one positioning integrity result based on the at least one positioning integrity check; wherein the at least one positioning integrity result comprises at least one measuring device positioning integrity result and at least one transmission reception point positioning integrity result; transmitting, to the measuring device, the at least one measuring device positioning integrity result and the at least one transmission reception point positioning integrity result; determining measuring device correction information, based on the at least one positioning integrity check; and transmitting, to the measuring device, the measuring device correction information.

Example 27. A method including: receiving, from a location management function or a user equipment, a request for transmission reception point positioning information; transmitting, to the location management function or to the user equipment, the transmission reception point positioning information; and receiving, from an integrity management function implemented by the location management function or the user equipment, transmission reception point correction information.

Example 28. A method including: receiving, from a location management function or a user equipment, a request for measuring device positioning information; transmitting, to the location management function or the user equipment, the measuring device positioning information; receiving, from an integrity management function implemented by the location management function or the user equipment, measuring device correction information; and receiving, from the integrity management function, at least one measuring device positioning integrity result and at and at least one transmission reception point positioning integrity result.

Example 29. A method including: receiving, from a location services client, a request for at least one positioning integrity result based on at least one measurement of a measuring device; transmitting, to an integrity management function, the request for the at least one positioning integrity result based on the at least one measurement of the measuring device; receiving, from the integrity management function, at least one positioning integrity result based on the at least one measurement of the measuring device; wherein the at least one positioning integrity result comprises at least one measuring device positioning integrity result or at least one transmission reception point positioning integrity result; and forwarding, to the location services client, the at least one positioning integrity result; wherein the method is performed with a location management function.

Example 30. An apparatus including: means for receiving, from a measuring device or a location management function, measuring device positioning information; means for performing at least one positioning integrity check, based on the measuring device positioning information; means for determining at least one positioning integrity result based on the at least one positioning integrity check; wherein the at least one positioning integrity result comprises at least one measuring device positioning integrity result and at least one transmission reception point positioning integrity result; means for transmitting, to the measuring device, the at least one measuring device positioning integrity result and the at least one transmission reception point positioning integrity result; means for determining measuring device correction information, based on the at least one positioning integrity check; and means for transmitting, to the measuring device, the measuring device correction information.

Example 31. An apparatus including: means for receiving, from a location management function or a user equipment, a request for transmission reception point positioning information; means for transmitting, to the location management function or to the user equipment, the transmission reception point positioning information; and means for receiving, from an integrity management function implemented by the location management function or the user equipment, transmission reception point correction information.

Example 32. An apparatus including: means for receiving, from a location management function or a user equipment, a request for measuring device positioning information; means for transmitting, to the location management function or the user equipment, the measuring device positioning information; means for receiving, from an integrity management function implemented by the location management function or the user equipment, measuring device correction information; and means for receiving, from the integrity management function, at least one measuring device positioning integrity result and at and at least one transmission reception point positioning integrity result.

Example 33. An apparatus including: means for receiving, from a location services client, a request for at least one positioning integrity result based on at least one measurement of a measuring device; means for transmitting, to an integrity management function, the request for the at least one positioning integrity result based on the at least one measurement of the measuring device; means for receiving, from the integrity management function, at least one positioning integrity result based on the at least one measurement of the measuring device; wherein the at least one positioning integrity result comprises at least one measuring device positioning integrity result or at least one transmission reception point positioning integrity result; and means for forwarding, to the location services client, the at least one positioning integrity result; wherein the apparatus comprises a location management function.

Example 34. A non-transitory computer readable medium including program instructions stored thereon for performing at least the following: receiving, from a measuring device or a location management function, measuring device positioning information; performing at least one positioning integrity check, based on the measuring device positioning information; determining at least one positioning integrity result based on the at least one positioning integrity check; wherein the at least one positioning integrity result comprises at least one measuring device positioning integrity result and at least one transmission reception point positioning integrity result; transmitting, to the measuring device, the at least one measuring device positioning integrity result and the at least one transmission reception point positioning integrity result; determining measuring device correction information, based on the at least one positioning integrity check; and transmitting, to the measuring device, the measuring device correction information.

Example 35. A non-transitory computer readable medium including program instructions stored thereon for performing at least the following: receiving, from a location management function or a user equipment, a request for transmission reception point positioning information; transmitting, to the location management function or to the user equipment, the transmission reception point positioning information; and receiving, from an integrity management function implemented by the location management function or the user equipment, transmission reception point correction information.

Example 36. A non-transitory computer readable medium including program instructions stored thereon for performing at least the following: receiving, from a location management function or a user equipment, a request for measuring device positioning information; transmitting, to the location management function or the user equipment, the measuring device positioning information; receiving, from an integrity management function implemented by the location management function or the user equipment, measuring device correction information; and receiving, from the integrity management function, at least one measuring device positioning integrity result and at and at least one transmission reception point positioning integrity result.

Example 37. A non-transitory computer readable medium including program instructions stored thereon for performing at least the following: receiving, from a location services client, a request for at least one positioning integrity result based on at least one measurement of a measuring device; transmitting, to an integrity management function, the request for the at least one positioning integrity result based on the at least one measurement of the measuring device; receiving, from the integrity management function, at least one positioning integrity result based on the at least one measurement of the measuring device; wherein the at least one positioning integrity result comprises at least one measuring device positioning integrity result or at least one transmission reception point positioning integrity result; and forwarding, to the location services client, the at least one positioning integrity result; wherein the instructions are performed with a location management function.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

3GPP third generation partnership project
4G fourth generation
5G fifth generation
5GC 5G core network
5GS 5G system
AL alert limit
ARP antenna reference point
AoA angle of arrival
AoD angle of departure
AMF access and mobility management function
ASIC application-specific integrated circuit
CD compact/computer disc
corr correlation
CPU central processing unit
CU central unit or centralized unit
DL downlink
DNU do not use
DSP digital signal processor
DU distributed unit
DVD digital versatile disc
eNB evolved Node B (e.g., an LTE base station)
EN-DC E-UTRAN new radio-dual connectivity
en-gNB node providing NR user plane and control plane protocol terminations towards the UE, and acting as a secondary node in EN-DC
E-UTRA evolved UMTS terrestrial radio access, i.e., the LTE radio access technology
E-UTRAN E-UTRA network
F1 interface between the CU and the DU
FFS for further study
FPGA field-programmable gate array
GMLC gateway mobile location center
gNB base station for 5G/NR, i.e., a node providing NR user plane and control plane protocol terminations towards the UE, and connected via the NG interface to the 5GC
GNSS global navigation satellite system
HMI hazardously misleading information
IAB integrated access and backhaul
ID identifier
IE information element
I/F interface
IMF integrity management function
I/O input/output
KPI key performance indicator
LCS location services
LMF location management function
LPP LTE positioning protocol
LTE long term evolution (4G)
MAC medium access control
MI misleading information
MME mobility management entity
MRO mobility robustness optimization
NAS non-access stratum
NCE network control element
NG-C NG control plane interface
ng or NG new generation
ng-eNB new generation eNB
NG-RAN new generation radio access network NL1 interface between the LMF and the AMF
NR new radio
NRPPa NR positioning protocol A
N/W network
PDA personal digital assistant
PDCP packet data convergence protocol
PHY physical layer
PE positioning error
PL protection level
Prob probability
PRS positioning reference signal
PRU positioning reference unit
RAM random access memory
RAN radio access network
RAN2 RAN working group 2
RAT radio access technology
RLC radio link control
ROM read-only memory
RP RAN plenary
RRC radio resource control
RSRP reference signal received power
RSRPP reference signal received path power
RSTD reference signal time difference
RTD round trip delay
RTOA relative time of arrival
RTT round trip time
RU radio unit
Rx receiver or reception
SDAP service data adaptation protocol
SET SUPL Enabled Terminal
SGW serving gateway
SLP SUPL Location Platform
SLPP sidelink positioning protocol
SMF session management function
SON self-organizing/optimizing network
SRS sounding reference signal
SUPL secure user plane location
TBS terrestrial beacon system
TDoA time difference of arrival
TIR target integrity risk
TP transmission point
TR technical report
TRP transmission reception point
TS technical specification
TTA time to alert
Tx, TX transmitter or transmission
UAV unmanned aerial vehicle
UE user equipment (e.g., a wireless, typically mobile device)
UI user interface
UL uplink
UMTS Universal Mobile Telecommunications System
UPF user plane function
USB universal serial bus
Uu air interface between the UE and the radio access network (RAN)
X2 network interface between RAN nodes and between RAN and the core network
Xn network interface between NG-RAN nodes

What is claimed is:

1. An apparatus comprising an Integrity Management Function (IMF) for a wireless positioning system, the apparatus comprising:

at least one processor; and at least one non-transitory memory storing instructions that, when executed by the at least one processor, cause the apparatus at least to:

receive, from a Location Management Function (LMF) of a core network, a request for at least one positioning integrity result using positioning reference unit (PRU) measurements, wherein the request comprises an indication to perform at least one positioning integrity check using measuring device positioning information and Transmission Reception Point (TRP) positioning information;

request, from a plurality of measuring devices or the LMF, the measuring device positioning information, wherein the request for the measuring device positioning information comprises:

measuring device measurement quantities comprising a list of requested measuring device information parameters, a measurement periodicity comprising a periodicity of realizations of the requested measuring device measurement quantities, and a measurement amount comprising a number of realizations of the requested measuring device measurement quantities;

receive, from the plurality of measuring devices or the LMF, the measuring device positioning information comprising:

a Downlink Positioning Reference Signal Received Signal Received Power (DL PRS-RSRP) measurement, and spatial direction information of uplink sounding reference signal (SRS) resources;

request, from the LMF, the TRP positioning information, wherein the request for the TRP positioning information comprises:

TRP measurement quantities comprising a list of requested measuring device information parameters, a measurement periodicity comprising a periodicity of realizations of the requested transmission reception point measurement quantities, and a measurement amount comprising a number of realizations of the requested transmission reception point measurement quantities;

receive, from the LMF, the TRP positioning information;

based on the measuring device positioning information and the TRP positioning information that is received, perform the at least one positioning integrity check, that identifies a source of a positioning error in either one of the plurality of measuring devices or a TRP, wherein performing the at least one positioning integrity check comprises:

deriving a first beam orientation error for the TRP based on Reference Signal Received Power (RSRP) measurements from a first measuring device of the plurality of measuring devices; and deriving a second beam orientation error for the TRP based on RSRP measurements from a second measuring device of the plurality of measuring devices;

comparing a difference between the first and second beam orientation errors to a threshold to determine that the source of the positioning error is the TRP or one of the plurality of measuring devices, and responsive to the difference between the first and second beam orientation errors exceeding the threshold, identifying a source measuring device of the plurality of measuring devices as the source of the positioning error based on a correlation of RSRP measurements among at least three measuring devices of the plurality of measuring devices;

based on the at least one positioning integrity check determine the at least one positioning integrity result indicating whether an inaccuracy is detected for the source measuring device or the TRP wherein the at least one positioning integrity result comprises:

at least one measuring device positioning integrity result, and at least one transmission reception point positioning integrity result;

determine measuring device correction information for the source measuring devices based on the at least one positioning integrity check, wherein the measuring device correction information comprises:

beam correction information comprising:

a correction to at least one parameter related to beam antenna information of the source measuring device, or a correction to at least one parameter related to sounding reference signal beam information of the source measuring device, and location correction information comprising a correction to at least one parameter related to location information of the source measuring device;

determine TRP correction information for the TRP based on the at least one positioning integrity check, wherein the TRP correction information comprises:

beam correction information further comprising a correction to at least one parameter related to:

beam antenna information of the radio access network node, or positioning reference signal beam information of the radio access network node, location correction information comprising a correction to at least one parameter related to location information of the radio access network node, and a correction for a beam orientation error of the transmission reception point;

transmit, to each of the plurality of measuring devices, the at least one measuring device positioning integrity result, the at least one TRP positioning integrity result, and the measuring device correction information;

transmit, to the TRP of the radio access network node, the TRP correction information; and transmit, to the LMF, the at least one positioning integrity result.

2. The apparatus of claim 1, wherein the at least one measuring device positioning integrity result comprises:

an indication of whether inaccurate measuring device beam antenna information has been detected by the apparatus, wherein the beam antenna information comprises beam direction information, a beam power profile, or other information, an indication of whether inaccurate measuring device location information has been detected by the apparatus, and an indication of whether inaccurate measuring device sounding reference signal beam information has been detected by the apparatus.

3. The apparatus of claim 1, wherein the at least one transmission reception point positioning integrity result comprises:

an indication of whether inaccurate transmission reception point beam antenna information has been detected by the apparatus, wherein the beam antenna information comprises beam direction information, a beam power profile, or other information, an indication of whether inaccurate transmission reception point location information has been detected by the apparatus, and an indication of whether inaccurate transmission reception point positioning reference signal beam information has been detected by the apparatus.

4. The apparatus of claim 1, wherein transmitting the at least one measuring device positioning integrity result, the at least one transmission reception point positioning integrity result, and the measuring device correction information to each of the plurality of measuring devices occurs over a sidelink positioning protocol (SLPP) connection.

5. The apparatus of claim 4, wherein the measuring device positioning information further comprises: Downlink Positioning Reference Signal Received Path Power (DL PRS-RSRPP), Downlink Angle-of-Departure (DL-AOD), or Downlink Time Difference of Arrival (DL-TDOA).

6. The apparatus of claim 5, wherein the transmission reception point positioning information comprises at least one of: Uplink Angle-of-Arrival (UL-AoA), Uplink Relative Time of Arrival (UL-RTOA), or a gNB Rx-Tx time difference measurement.

7. The apparatus of claim 6, wherein the request for the at least one positioning integrity result received from the location management function is initiated in response to a location service request from a location services client.

8. An apparatus comprising:

a radio access network node hosting a transmission reception point (TRP), the radio access network node comprising:

at least one processor; and at least one non-transitory memory storing instructions that, when executed by the at least one processor, cause the radio access network node at least to:

receive, from an integrity management function (IMF) implemented by a location management function (LMF) or by a user equipment, a request for TRP positioning information, wherein the request comprises one of:

TRP measurement quantities comprising a list of requested parameters including at least one of:

a gNB-RxTxTimeDiff, an uplink sounding reference signal reference signal received power (UL-SRS-RSRP), an uplink angle of arrival (UL-AoA), or an uplink relative time of arrival (UL-RTOA), a measurement periodicity, or a measurement amount;

transmit, to the IMF, the TRP positioning information, wherein the TRP positioning information comprises at least one of:

a measurement result, positioning reference signal (PRS) beam information comprising spatial direction information of downlink (DL) PRS resources, including a PRS azimuth angle and a PRS elevation angle, beam antenna information comprising a TRP identifier, a TRP azimuth angle, a TRP elevation angle, and a TRP beam power profile, or location information of the radio access network node comprising geographical coordinates for the TRP and an associated Antenna Reference Point (ARP);

receive, from the IMF, TRP correction information, wherein the TRP correction information is generated by the IMF based on an integrity check comparing the TRP positioning information with measuring device positioning information received from a plurality of Positioning Reference Units (PRUs), the TRP correction information comprising:

beam correction information comprising a correction to at least one parameter related to the beam antenna information of the radio access network node, wherein the beam antenna information comprises a beam direction or a beam power profile, location correction information comprising a correction to at least one parameter related to the location information of the radio access network node, a correction for a beam orientation error of the TRP, and beam correction information comprising a correction to at least one parameter related to the PRS beam information of the radio access network node; and apply the received TRP correction information to update at least one stored parameter of the radio access network node to improve positioning accuracy, wherein the at least one stored parameter comprises: a beam azimuth angle, a beam elevation angle, a beam power profile, or geographical coordinates of the radio access network node.

9. An apparatus operating as a measuring device comprising a positioning reference unit (PRU), the apparatus comprising:

at least one processor; and at least one non-transitory memory storing instructions that, when executed by the at least one processor, cause the apparatus at least to:

receive, from an integrity management function (IMF) implemented by a location management function or by a user equipment, a request for measuring device positioning information, wherein the request for the measuring device positioning information comprises: measuring device measurement quantities, a measurement periodicity, and a measurement amount;

transmit, to the IMF, the measuring device positioning information comprising:

a Downlink Positioning Reference Signal Received Signal Received Power (DL PRS-RSRP) measurement, a timestamp, a Downlink Positioning Reference Signal Received Path Power (DL PRS-RSRPP) measurement, a Downlink Angle-of-Departure (DL-AOD) measurement, a Downlink Time Difference of Arrival (DL-TDOA) measurement, a Multi-cell Round Trip Time (Multi-cell RTT) measurement, spatial direction information of uplink sounding reference signal (SRS) resources, beam antenna information of the apparatus comprising a PRU-antenna azimuth angle, a PRU-antenna elevation angle, and a PRU-antenna beam power profile, and location information comprising geographical coordinates for the apparatus;

receive, from the IMF, measuring device correction information, wherein the measuring device correction information comprises at least one of:

beam correction information comprising a correction to at least one parameter related to the beam antenna information of the apparatus, location correction information comprising a correction to at least one parameter related to location information of the apparatus, or sounding reference signal correction information comprising a correction to at least one parameter related to the spatial direction information of the uplink SRS resources; and receive, from the IMF, at least one measuring device positioning integrity result and at least one transmission reception point (TRP) positioning integrity result, wherein the at least one measuring device positioning integrity result comprises at least one of:

a first flag indicating detection of misleading beam antenna information of the apparatus, a second flag indicating detection of misleading location information of the apparatus, or a third flag indicating detection of misleading sounding reference signal beam information of the apparatus.

10. An apparatus comprising:

at least one processor; and at least one non-transitory memory storing instructions that, when executed by the at least one processor, cause the apparatus at least to:

receive, from a location services client, a request for at least one positioning integrity result based on at least one measurement of a measuring device, wherein the request comprises an Integrity UsingPRUMeasurementsFlag to trigger at least one positioning integrity check;

request, from a plurality of measuring devices, measuring device positioning information, wherein the request for measuring device positioning information comprises a list of PRU-Measurement Quantities, and wherein each of the plurality of measuring devices comprises a positioning reference unit (PRU);

receive, from the plurality of measuring devices, the measuring device positioning information comprising PRU-BeamAntennaInformation and a PRU-MeasurementResult for each of the plurality of measuring devices;

request, from a radio access network node hosting a transmission reception point (TRP), TRP positioning information;

receive, from the radio access network node, the TRP positioning information;

based on the measuring device positioning information and the TRP positioning information, perform the at least one positioning integrity check that identifies a source of a positioning error in either the TRP or one of the plurality of measuring devices, wherein performing the at least one positioning integrity check comprises:

deriving a first beam orientation error for the TRP based on Reference Signal Received Power (RSRP) measurements from a first measuring device of the plurality of measuring devices; and deriving a second beam orientation error for the TRP based on RSRP measurements from a second measuring device of the plurality of measuring devices;

comparing a difference between the first and second beam orientation errors to a first threshold;

in response to the difference being below the first threshold, comparing the first and second beam orientation errors to a second threshold to identify the TRP as the source of the positioning error; and in response to the difference exceeding the first threshold, identifying one of the first or second measuring devices as the source of the positioning error based on a correlation of RSRP measurements among at least three of the plurality of measuring devices;

based on the at least one positioning integrity check, determine at least one positioning integrity result based on the identified source of the positioning error, determine correction information comprising a beam orientation error value;

wherein the at least one positioning integrity result comprises at least one measuring device positioning integrity result or at least one TRP positioning integrity result, wherein the at least one measuring device positioning integrity result comprises:

an indication of whether inaccurate measuring device beam antenna information has been detected, wherein the beam antenna information comprises beam direction information, and a beam power profile, an indication of whether inaccurate measuring device location information has been detected, and an indication of whether inaccurate measuring device sounding reference signal beam information has been detected, and wherein the at least one TRP positioning integrity result comprises a MisleadingBeamInformationFlag indicating whether misleading TRP beam information is detected;

transmit, to at least one of the plurality of measuring devices, the following:

at least one measuring device positioning integrity result and the at least one TRP positioning integrity result;

the correction information to the identified specific source of the positioning error; and transmit, to the location services client, the at least one positioning integrity result, wherein the apparatus comprises a location management function that implements an integrity management function (IMF).

* * * * *